(12) United States Patent
Ko et al.

(10) Patent No.: US 11,510,251 B2
(45) Date of Patent: Nov. 22, 2022

(54) METHOD FOR PERFORMING RANDOM ACCESS PROCEDURE AND DEVICE THEREFOR

(71) Applicant: LG ELECTRONICS INC., Seoul (KR)

(72) Inventors: Hyunsoo Ko, Seoul (KR); Byounghoon Kim, Seoul (KR); Joonkui Ahn, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/586,229

(22) Filed: Jan. 27, 2022

(65) Prior Publication Data

US 2022/0167427 A1    May 26, 2022

Related U.S. Application Data

(63) Continuation of application No. PCT/KR2021/002148, filed on Feb. 19, 2021.

(30) Foreign Application Priority Data

Feb. 21, 2020  (KR) .................. 10-2020-0021881
Apr. 10, 2020  (KR) .................. 10-2020-0044260

(51) Int. Cl.
*H04W 4/00*       (2018.01)
*H04W 74/08*      (2009.01)
*H04W 72/12*      (2009.01)

(52) U.S. Cl.
CPC ... *H04W 74/0833* (2013.01); *H04W 72/1289* (2013.01)

(58) Field of Classification Search
CPC ............ H04W 74/0833; H04W 72/1289
See application file for complete search history.

(56) References Cited

U.S. PATENT DOCUMENTS

2013/0242730 A1*  9/2013  Pelletier ............ H04W 74/0833
                                                    370/230
2019/0254034 A1*  8/2019  Liu .................. H04L 1/1642
2020/0374928 A1* 11/2020  Xiong ................ H04W 72/042

FOREIGN PATENT DOCUMENTS

WO    2017039374 A1    3/2017

OTHER PUBLICATIONS

3GPP TSG RAN WG1 Meeting #99, "Initial access and mobility procedures for NR unlicensed", Nov. 18, 2019, R1-1912939 (Year: 2019).*
Qualcomm Incorporated, "Initial access and mobility procedures for NR unlicensed", 3GPP TSG RAN WG1 Meeting #99, Nov. 18-22, 2019, R1-1912939.

(Continued)

*Primary Examiner* — Siren Wei
(74) *Attorney, Agent, or Firm* — Dentons US LLP

(57) ABSTRACT

The present disclosure provides a method for receiving a physical downlink shared channel (PDSCH) by a terminal in a wireless communication system. Specifically, the method may comprise: transmitting a physical random access channel (PRACH); monitoring a downlink control channel (DCI) for scheduling a PDSCH related to the PRACH; and receiving the PDSCH on the basis of the DCI, wherein the DCI is detected on the basis of a radio network temporary identifier (RNTI).

11 Claims, 27 Drawing Sheets

(56) References Cited

OTHER PUBLICATIONS

Zte, Sanechips, "Remaining issues of the 2-step RACH procedures", 3GPP TSG RAN WG1 Meeting #100, Feb. 24-Mar. 6, 2020, R1-2000397.
Ericsson, "Enhancements to Initial Access Procedures", 3GPP TSG-RAN WG1 Meeting #100-e, Feb. 24-Mar. 6, 2020, R1-2000827.
Ericsson, "RNTI design and HARQ aspects for 2-step RA", 3GPP TSG-RAN WG2 #107bis, Oct. 14-18, 2019, R2-1912679.

* cited by examiner

FIG. 11
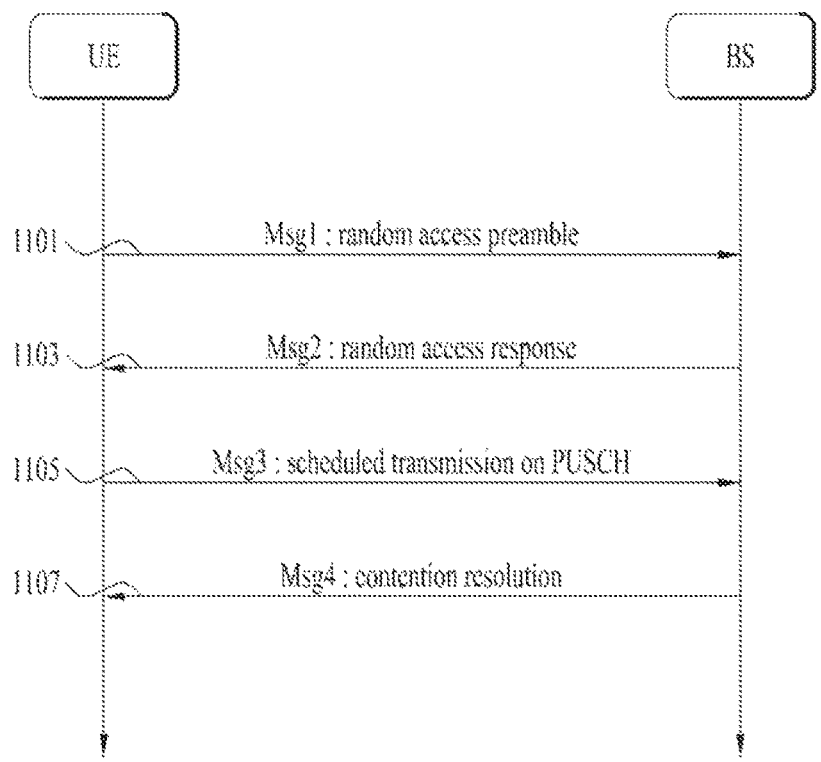
(a)
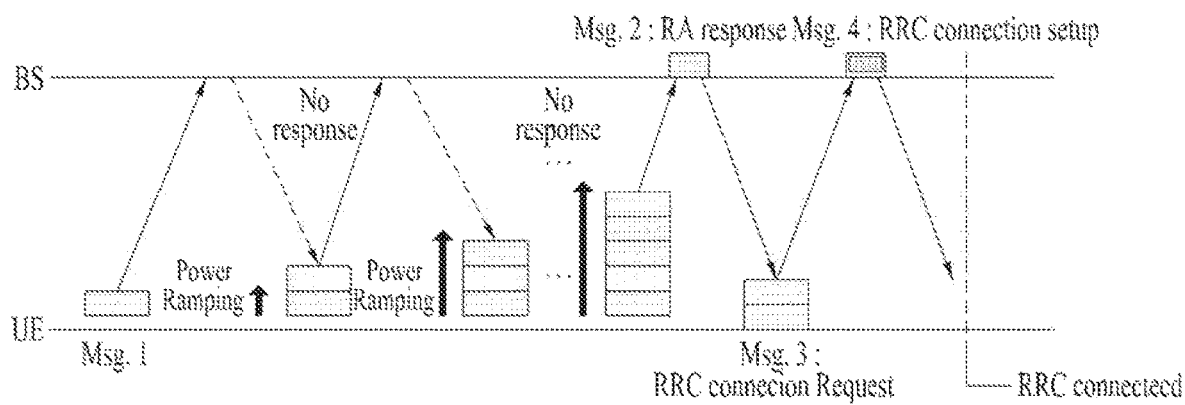
(b)

FIG. 16

METHOD FOR PERFORMING RANDOM ACCESS PROCEDURE AND DEVICE THEREFOR

This application is the Continuation Bypass of International Application No. PCT/KR2021/002148 filed on Feb. 19, 2021, which claims the benefit of Korean Patent Application Nos. 10-2020-0021881 filed on Feb. 21, 2020 and 10-2020-0044260 filed on Apr. 10, 2020, the contents of which are all hereby incorporated by reference herein in their entirety.

TECHNICAL FIELD

The present disclosure relates to a method of performing a random access procedure and apparatus therefor, and more particularly, a method of performing a two-step random access procedure (Type-2 random access procedure) by a user equipment (UE) and apparatus therefor.

BACKGROUND ART

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE

Technical Problem

The object of the present disclosure is to provide a method of performing a random access procedure and apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, there is provided a method of receiving a physical downlink shared channel (PDSCH) by a user equipment (UE) in a wireless communication system. The method may include: transmitting a physical random access channel (PRACH); monitoring downlink control information (DCI) for scheduling a PDSCH related to the PRACH; and receiving the PDSCH based on the DCI, based on the DCI being detected based on a radio network temporary identifier (RNTI).

In this case, the PDSCH is received regardless of whether two bits for a first system frame number (SFN) included in the DCI are identical to two bits for a second SFN in which the PRACH is transmitted.

Additionally, based on the UE being incapable of checking whether two bits for a first system frame number (SFN) included in the DCI are identical to two bits for a second SFN in which the PRACH is transmitted, the PDSCH is received based on the DCI.

Additionally, based on the UE being capable of checking whether two bits for a first system frame number (SFN) included in the DCI are identical to two bits for a second SFN in which the PRACH is transmitted and the UE confirming that the two bits for the first SFN are not identical to the two bits for the second SFN, the PDSCH is not received.

Additionally, based on the UE being capable of checking whether two bits for a first system frame number (SFN) included in the DCI are identical to two bits for a second SFN in which the PRACH is transmitted and the UE confirming that the two bits for the first SFN are identical to the two bits for the second SFN, the PDSCH is received based on the DCI.

Additionally, a length of a monitoring window for the DCI may exceed 10 ms.

Additionally, the RNTI is a MsgB-RNTI.

In another aspect of the present disclosure, there is provided a UE configured to receive a PDSCH in a wireless communication system. The UE may include: at least one transceiver; at least one processor; and at least one memory operably connected to the at least one processor and configured to store instructions that, when executed, cause the at least one processor to perform operations. The operations may include: transmitting a physical random access channel (PRACH) through the at least one transceiver; monitoring downlink control information (DCI) for scheduling a PDSCH related to the PRACH; and receiving the PDSCH based on the DCI through the at least one transceiver, based on the DCI being detected based on a radio network temporary identifier (RNTI).

In this case, the PDSCH is received regardless of whether two bits for a first system frame number (SFN) included in the DCI are identical to two bits for a second SFN in which the PRACH is transmitted.

Additionally, based on the UE being incapable of checking whether two bits for a first system frame number (SFN) included in the DCI are identical to two bits for a second SFN in which the PRACH is transmitted, the PDSCH is received based on the DCI.

Additionally, based on the UE being capable of checking whether two bits for a first system frame number (SFN) included in the DCI are identical to two bits for a second SFN in which the PRACH is transmitted and the UE confirms that the two bits for the first SFN are not identical to the two bits for the second SFN, the PDSCH is not received.

Additionally, based on the UE being capable of checking whether two bits for a first system frame number (SFN) included in the DCI are identical to two bits for a second SFN in which the PRACH is transmitted and the UE confirms that the two bits for the first SFN are identical to the two bits for the second SFN, the PDSCH is received based on the DCI.

Additionally, a length of a monitoring window for the DCI may exceed 10 ms.

Additionally, the RNTI may be a MsgB-RNTI.

In a further aspect of the present disclosure, there is provided an apparatus configured to receive a PDSCH in a wireless communication system. The apparatus may include: at least one processor; and at least one memory operably connected to the at least one processor and configured to store instructions that, when executed, cause the at least one processor to perform operations. The operations may include: transmitting a physical random access channel (PRACH); monitoring downlink control information (DCI) for scheduling a PDSCH related to the PRACH; and receiving the PDSCH based on the DCI, based on the DCI being detected based on a radio network temporary identifier (RNTI).

Advantageous Effects

According to the present disclosure, when a user equipment (UE) does not know the index of a system frame number (SFN) for transmitting a physical random access channel (PRACH) or does not interpret the index of an SFN included in received downlink control information (DCI) to reduce delay caused by decoding of the DCI, the UE may efficiently perform a 2-step random access procedure (Type-2 random access procedure).

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

FIG. 11 is a diagram illustrating an exemplary 4-step random access channel (RACH) procedure.

FIG. 16 is a diagram illustrating exemplary RACH occasion configurations.

BEST MODE

Figure 1:
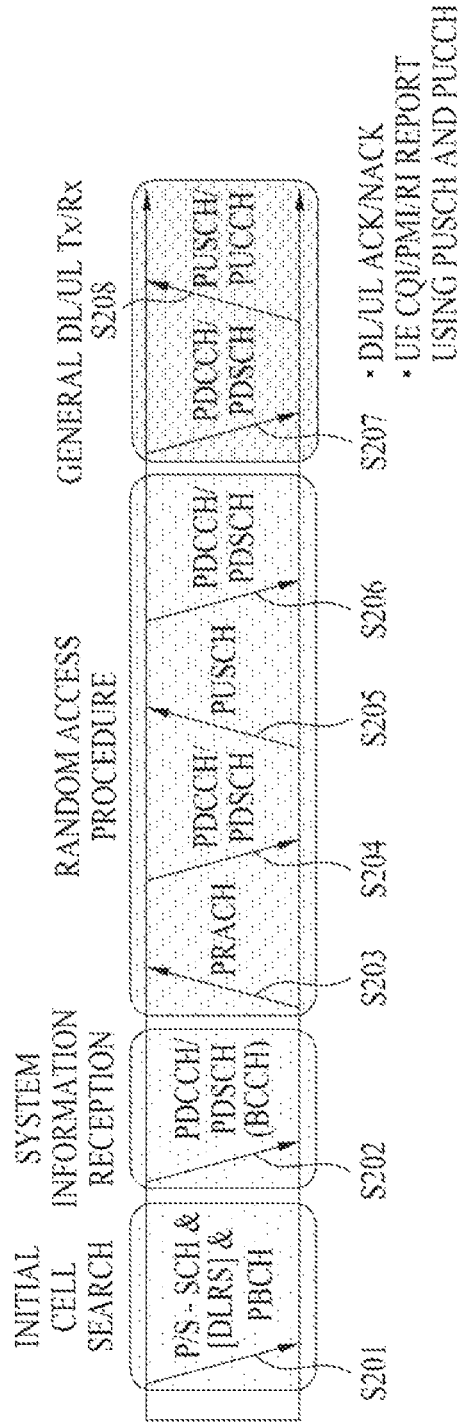
FIG. 1 is a diagram illustrating physical channels and a general signal transmission method using the physical channels in a 3GPP system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 illustrates physical channels and a general method for transmitting signals on the physical channels in the 3GPP system.

Referring to FIG. 1, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

The use of an ultra-high frequency band, that is, a millimeter frequency band at or above 6 GHz is under consideration in the NR system to transmit data in a wide frequency band, while maintaining a high transmission rate for multiple users. The 3GPP calls this system NR. In the present disclosure, the system will also be referred to as an NR system.

The NR system adopts the OFDM transmission scheme or a similar transmission scheme. Specifically, the NR system may use OFDM parameters different from those in LTE. Further, the NR system may follow the legacy LTE/LTE-A numerology but have a larger system bandwidth (e.g., 100 MHz). Further, one cell may support a plurality of numerologies in the NR system. That is, UEs operating with different numerologies may coexist within one cell.

Figure 2:
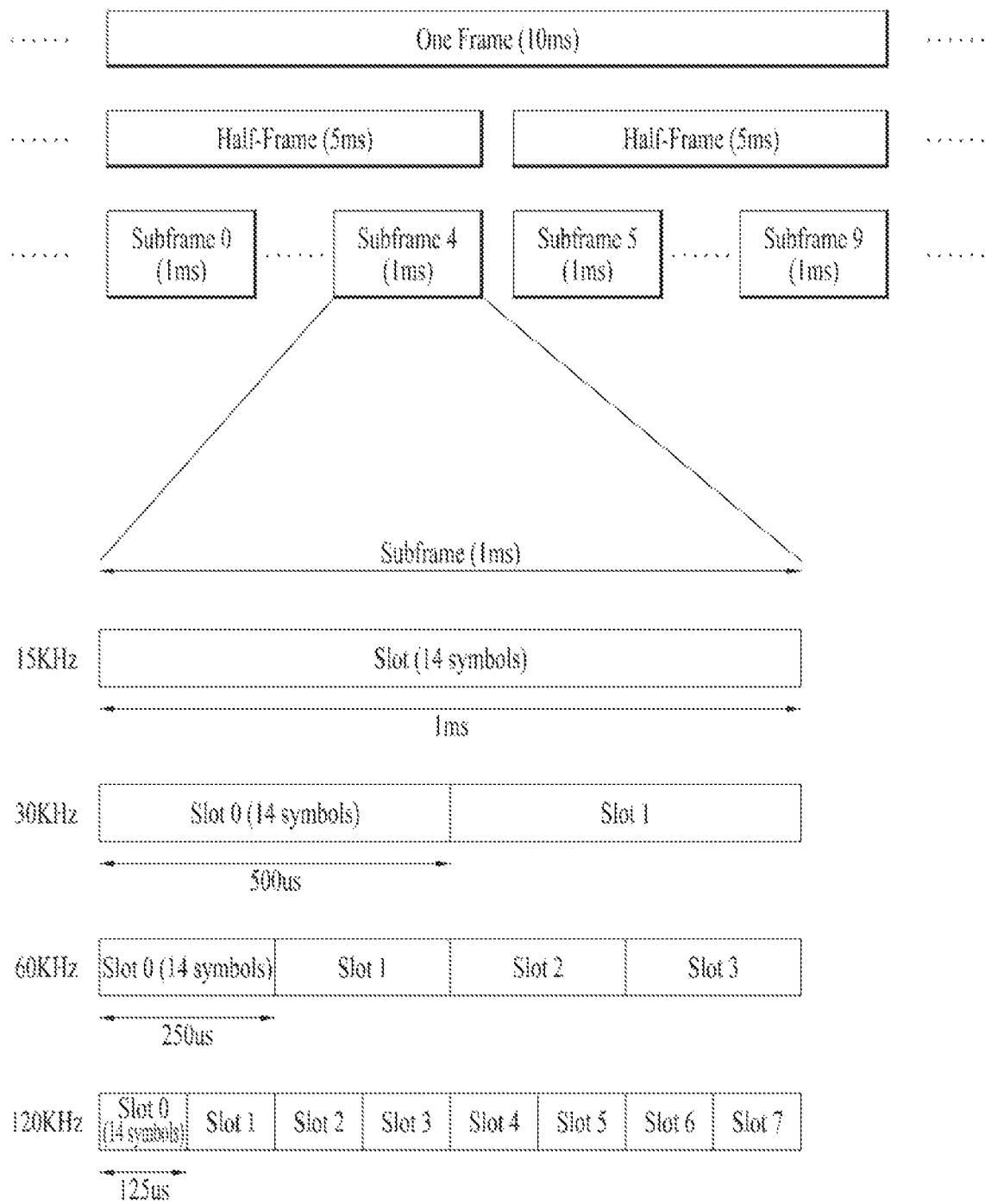
FIGS. 2, 3 and 4 are diagrams illustrating structures of a radio frame and slots used in a new RAT (NR) system.

FIG. 2 illustrates a structure of a radio frame used in NR.

In NR, UL and DL transmissions are configured in frames. The radio frame has a length of 10 ms and is defined as two 5-ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

[Table 1] illustrates that the number of symbols per slot, the number of slots per frame, and the number of slots per subframe vary according to the SCS when the normal CP is used.

TABLE 1

| SCS (15 * 2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in a slot
* $N^{frame,u}_{slot}$: Number of slots in a frame
* $N^{subframe,u}_{slot}$: Number of slots in a subframe

[Table 2] illustrates that the number of symbols per slot, the number of slots per frame, and the number of slots per subframe vary according to the SCS when the extended CP is used.

TABLE 2

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells.

Figure 3:
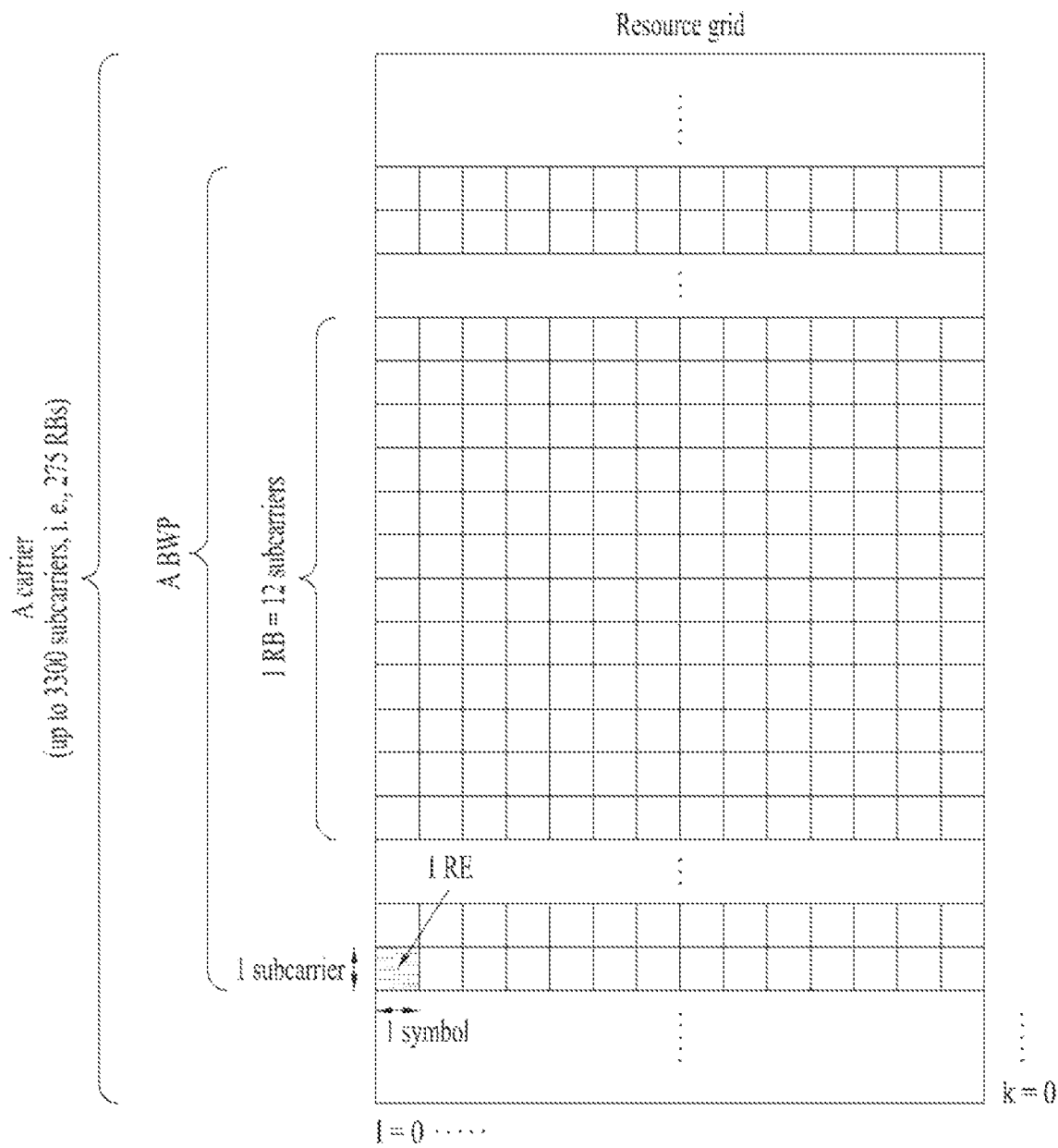

FIG. 3 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 4:
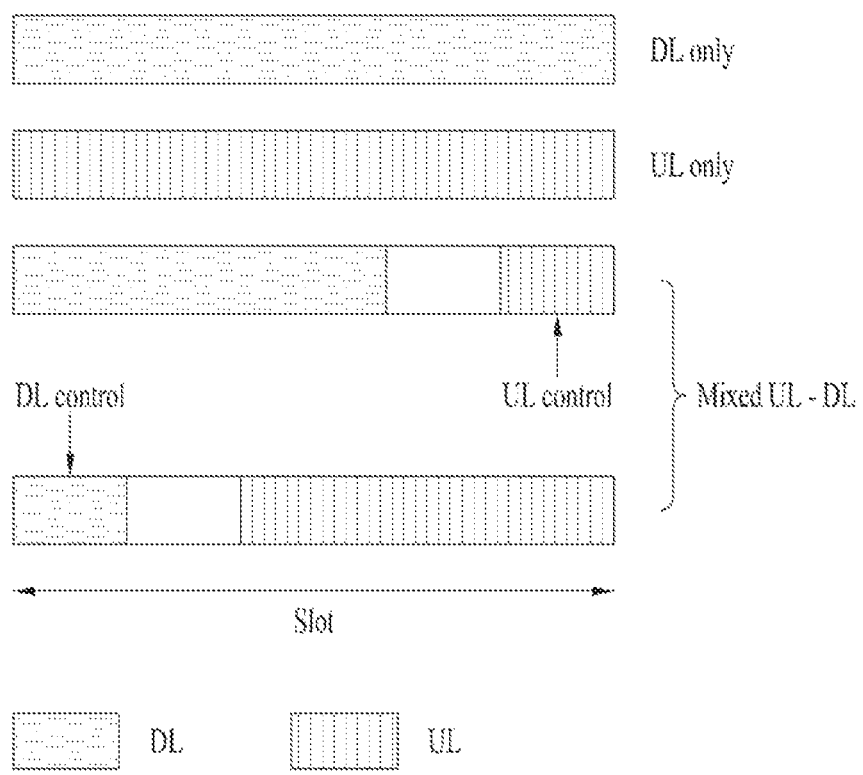

FIG. 4 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   * DL region: (i) DL data region, (ii) DL control region+DL data region
   * UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

Figure 5:
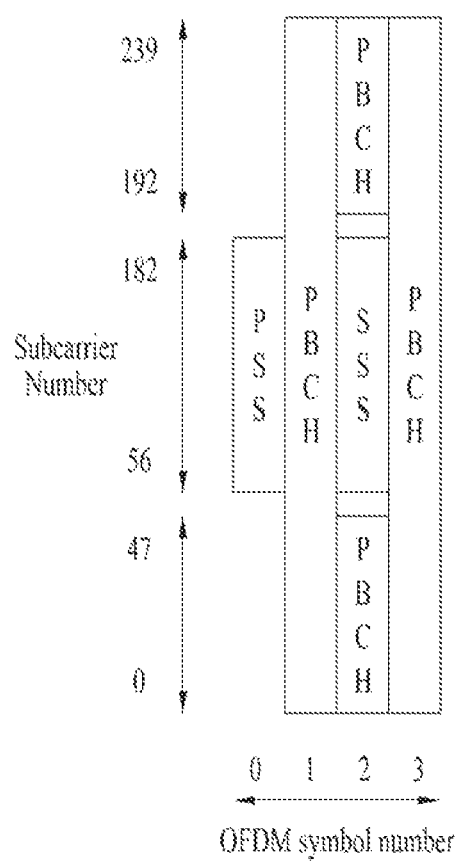
FIGS. 5, 6, 7, 8, 9 and 10 are diagrams illustrating the composition of a synchronization signal/physical broadcast channel (SS/PBCH) block and a method of transmitting an SS/PBCH block.

FIG. 5 illustrates a synchronization signal block (SSB) structure. The UE may perform cell search, system information acquisition, beam alignment for initial access, DL measurement, and so on based on an SSB. The term SSB is used interchangeably with synchronization signal/physical broadcast channel (SS/PBCH) block.

Referring to FIG. 5, an SSB is composed of a PSS, an SSS, and a PBCH. The SSB includes four consecutive OFDM symbols. The PSS, the PBCH, the SSS/PBCH, and the PBCH are transmitted on the respective OFDM symbols. Each of the PSS and the SSS includes one OFDM symbol and 127 subcarriers, and the PBCH includes 3 OFDM symbols and 576 subcarriers. Polar coding and quadrature phase shift keying (QPSK) are applied to the PBCH. The PBCH includes data REs and demodulation reference signal (DMRS) REs in each OFDM symbol. There are three DMRS REs per RB, with three data REs between every two adjacent DMRS REs.

Cell Search

The cell search refers to a procedure in which the UE obtains time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as described in Table 3 below.

TABLE 3

| | Type of Signals | Operations |
|---|---|---|
| 1st step | PSS | * SS/PBCH block (SSB) symbol timing acquisition<br>* Cell ID detection within a cell ID group (3 hypothesis) |
| 2nd Step | SSS | * Cell ID group detection (336 hypothesis) |
| 3rd Step | PBCH DMRS | * SSB index and Half frame (HF) index (Slot and frame boundary detection) |
| 4th Step | PBCH | * Time information (80 ms, System Frame Number (SFN), SSB index, HF)<br>* Remaining Minimum System Information (RMSI) Control resource set (CORESET)/Search space configuration |
| 5th Step | PDCCH and PDSCH | * Cell access information<br>* RACH configuration |

Figure 6:
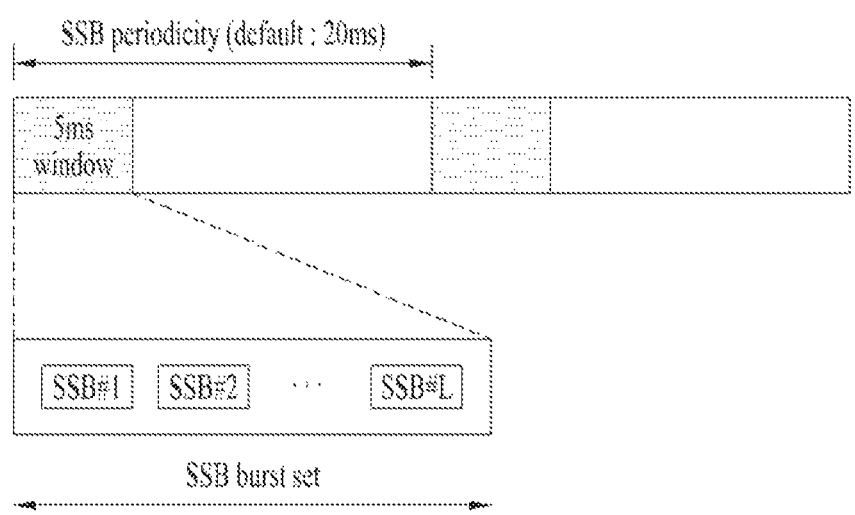

FIG. 6 illustrates SSB transmission.

Referring to FIG. 6, an SSB is periodically transmitted according to the SSB periodicity. The basic SSB periodicity assumed by the UE in the initial cell search is defined as 20 ms. After the cell access, the SSB periodicity may be set to one of {5 ms, 10 ms, 20 ms, 40 ms, 80 ms, 160 ms} by the network (e.g., the BS). An SSB burst set may be configured at the beginning of an SSB period. The SSB burst set may be configured with a 5-ms time window (i.e., half-frame), and an SSB may be repeatedly transmitted up to L times within the SS burst set. The maximum number of transmissions of the SSB, L may be given according to the frequency band of a carrier as follows. One slot includes up to two SSBs.

For frequency range up to 3 GHz, L=4

For frequency range from 3 GHz to 6 GHz, L=8

For frequency range from 6 GHz to 52.6 GHz, L=64

The time position of an SSB candidate in the SS burst set may be defined according to the SCS as follows. The time positions of SSB candidates are indexed as (SSB indexes) 0 to L-1 in temporal order within the SSB burst set (i.e., half-frame).

Case A—15-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case B—30-kHz SCS: The indexes of the first symbols of candidate SSBs are given as {4, 8, 16, 20}+28*n where n =0 for a carrier frequency equal to or lower than 3 GHz, and n=0, 1 for a carrier frequency of 3 GHz to 6 GHz.

Case C—30-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case D—120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 fora carrier frequency above 6 GHz.

Case E—240-kHz SCS: The indexes of the first symbols of candidate SSBs are given as {8, 12, 16, 20, 32, 36, 40, 44}+56*n where n=0, 1, 2, 3, 5, 6, 7, 8 for a carrier frequency above 6 GHz.

Figure 7:
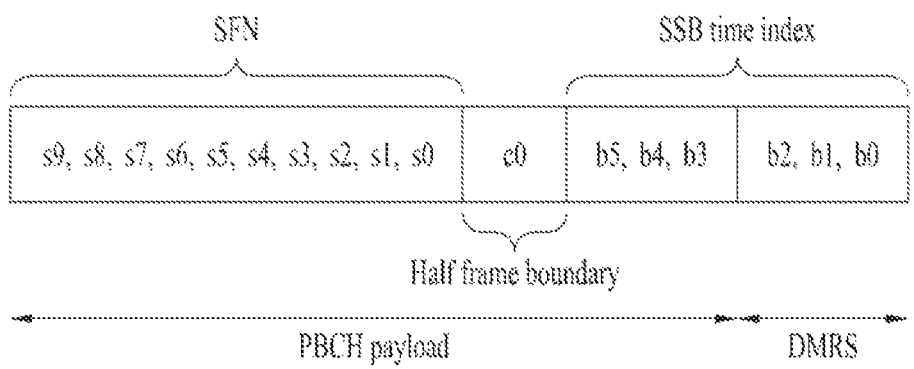

FIG. 7 illustrates exemplary acquisition of information about DL time synchronization at a UE.

Referring to FIG. 7, the UE may acquire DL synchronization by detecting an SSB. The UE may identify the structure of an SSB burst set based on the index of the detected SSB, and thus detect a symbol/slot/half-frame boundary. The number of a frame/half-frame to which the detected SSB belongs may be identified by SFN information and half-frame indication information.

Specifically, the UE may acquire 10-bit SFN information, s0 to s9 from a PBCH. 6 bits of the 10-bit SFN information is acquired from a master information block (MIB), and the remaining 4 bits is acquired from a PBCH transport block (TB).

Subsequently, the UE may acquire 1-bit half-frame indication information c0. If a carrier frequency is 3GH or below, the half-frame indication information may be signaled implicitly by a PBCH DMRS. The PBCH DMRS indicates 3-bit information by using one of 8 PBCH DMRS sequences. Therefore, if L=4, the remaining one bit except for two bits indicating an SSB index in the 3-bit information which may be indicated by 8 PBCH DMRS sequences may be used for half-frame indication.

Finally, the UE may acquire an SSB index based on the DMRS sequence and the PBCH payload. SSB candidates are indexed from 0 to L-1 in a time order within an SSB burst set (i.e., half-frame). If L=8 or 64, three least significant bits (LSBs) b0 to b2 of the SSB index may be indicated by 8 different PBCH DMRS sequences. If L=64, three most significant bits (MSBs) b3 to b5 of the SSB index is indicated by the PBCH. If L=2, two LSBs b0 and b1 of an SSB index may be indicated by 4 different PBCH DMRS sequences. If L=4, the remaining one bit b2 except for two bits indicating an SSB index in 3-bit information which may be indicated by 8 PBCH DMRS sequences may be used for half-frame indication.

System Information Acquisition

Figure 8:
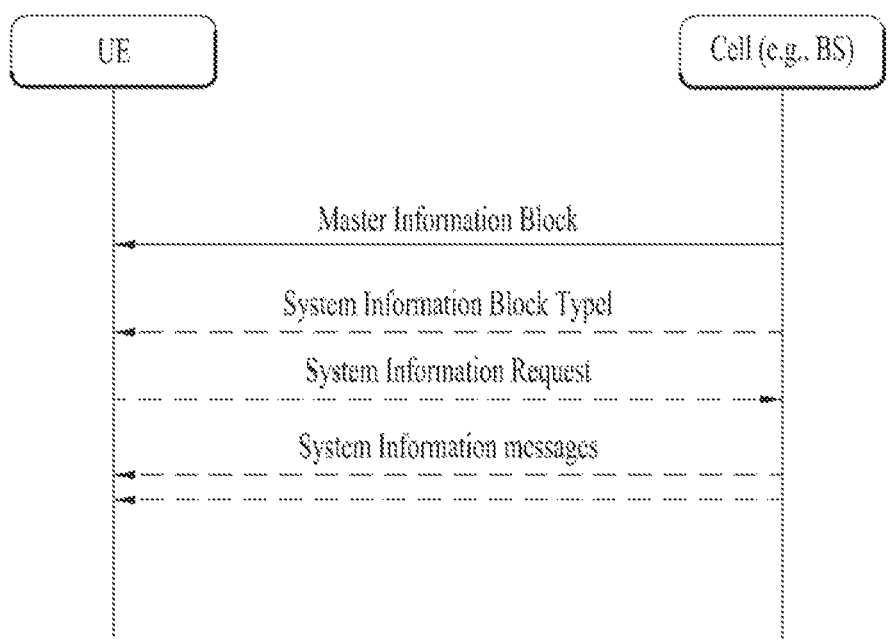

FIG. 8 illustrates a system information (SI) acquisition procedure. The UE may obtain access stratum (AS)-/non-access stratum (NAS)-information in the SI acquisition procedure. The SI acquisition procedure may be applied to UEs in RRC_IDLE, RRC_INACTIVE, and RRC_CONNECTED states.

SI is divided into a master information block (MIB) and a plurality of system information blocks (SIB s). The MIB and the plurality of SIBs are further divided into minimum SI and other SI. The minimum SI may include the MIB and systemInformationBlock1 (SIB1), carrying basic information required for initial access and information required to obtain the other SI. SIB1 may also be referred to as remaining minimum system information (RMSI). For details, the following may be referred to.

The MIB includes information/parameters related to reception of SIB1 and is transmitted on the PBCH of an SSB. The UE assumes that a half-frame including an SSB is repeated every 20 ms during initial cell selection. The UE may determine from the MIB whether there is any control resource set (CORESET) for a Type0-PDCCH common search space. The Type0-PDCCH common search space is a kind of PDCCH search space and used to transmit a PDCCH that schedules an SI message. In the presence of a Type0-PDCCH common search space, the UE may determine (1) a plurality of contiguous RBs and one or more consecutive symbols included in a CORESET, and (ii) a PDCCH occasion (e.g., a time-domain position at which a PDCCH is to be received), based on information (e.g., pdcch-ConfigSIB1) included in the MIB. In the absence of a Type0-PDCCH common search space, pdcch-ConfigSIB1 provides information about a frequency position at which the SSB/SIB1 exists and information about a frequency range without any SSB/SIB1.

SIB1 includes information related to availability and scheduling (e.g., a transmission periodicity and an SI-window size) of the remaining SIBs (hereinafter, referred to as SIBx where x is an integer equal to or larger than 2). For example, SIB1 may indicate whether SIBx is broadcast periodically or in an on-demand manner upon UE request. If SIBx is provided in the on-demand manner, SIB1 may include information required for the UE to transmit an SI request. A PDCCH that schedules SIB1 is transmitted in the Type0-PDCCH common search space, and SIB1 is transmitted on a PDSCH indicated by the PDCCH.

SIBx is included in an SI message and transmitted on a PDSCH. Each SI message is transmitted within a periodic time window (i.e., SI-window).

Beam Alignment

Figure 9:
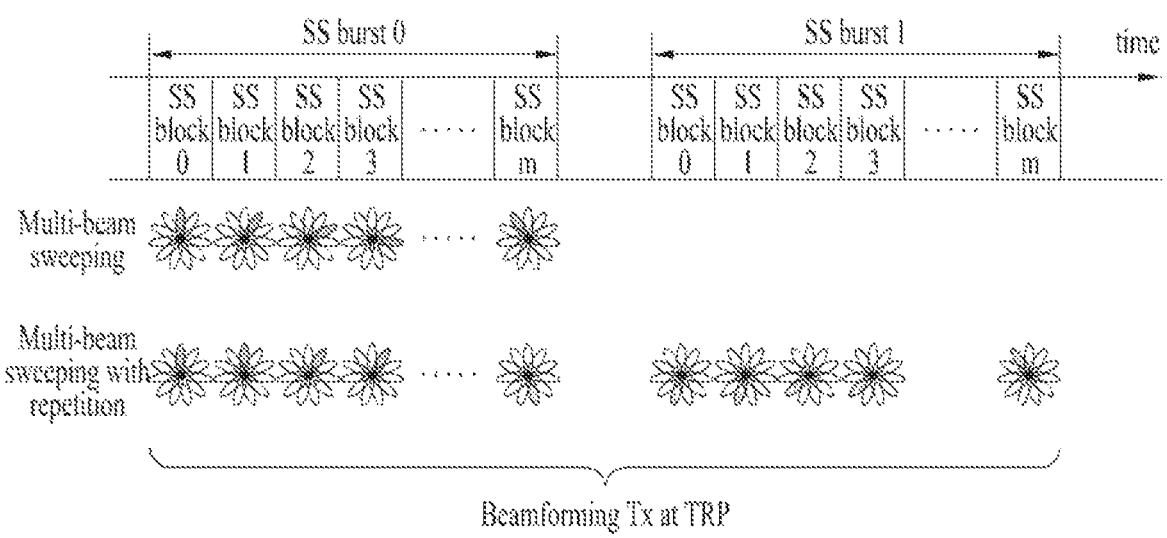

FIG. 9 illustrates exemplary multi-beam transmission of SSBs.

Figure 10:
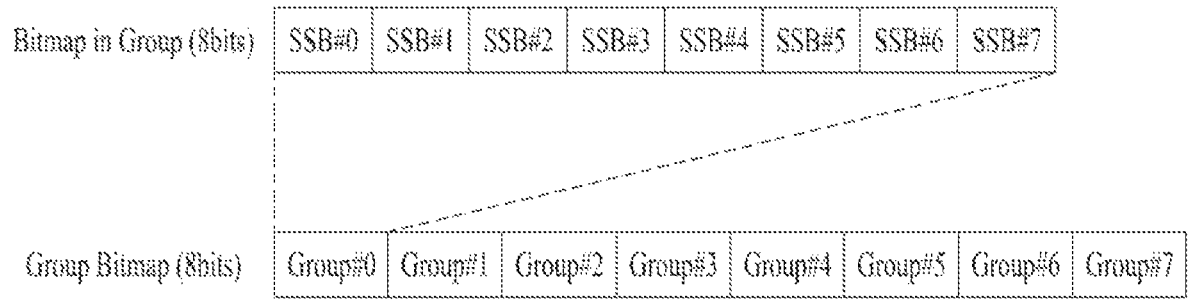

Beam sweeping refers to changing the beam (direction) of a wireless signal over time at a transmission reception point (TRP) (e.g., a BS/cell) (hereinafter, the terms beam and beam direction are interchangeably used). Referring to FIG. 10, an SSB may be transmitted periodically by beam sweeping. In this case, SSB indexes are implicitly linked to SSB beams. An SSB beam may be changed on an SSB (index) basis or on an SS (index) group basis. In the latter, the same SSB beam is maintained in an SSB (index) group. That is, the transmission beam direction of an SSB is repeated for a plurality of successive SSBs. The maximum allowed transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range of up to 3 GHz, maximum number of beams=4

For frequency range from 3 GHz to 6 GHz, maximum number of beams=8

For frequency range from 6 GHz to 52.6 GHz, maximum number of beams=64

Without multi-beam transmission, the number of SSB beams is 1.

When the UE attempts initial access to the BS, the UE may align beams with the BS based on an SSB. For example, the UE performs SSB detection and then identifies a best SSB. Subsequently, the UE may transmit an RACH preamble in PRACH resources linked/corresponding to the index (i.e., beam) of the best SSB. The SSB may also be used for beam alignment between the BS and the UE even after the initial access.

Channel Estimation and Rate-Matching

FIG. 10 illustrates an exemplary method of indicating actually transmitted SSBs, SSB_tx.

Up to L SSBs may be transmitted in an SSB burst set, and the number and positions of actually transmitted SSBs may be different for each BS or cell. The number and positions of actually transmitted SSBs are used for rate-matching and measurement, and information about actually transmitted SSBs is indicated as follows.

If the information is related to rate matching, the information may be indicated by UE-specific RRC signaling or RMSI. The UE-specific RRC signaling includes a full bitmap (e.g., of length L) for frequency ranges below and above 6 GHz. The RMSI includes a full bitmap for a frequency range below 6 GHz and a compressed bitmap for a frequency range above 6 GHz, as illustrated. Specifically, the information about actually transmitted SSBs may be indicated by a group-bitmap (8 bits)+an in-group bitmap (8 bits). Resources (e.g., REs) indicated by the UE-specific RRC signaling or the RMSI may be reserved for SSB transmission, and a PDSCH and/or a PUSCH may be rate-matched in consideration of the SSB resources.

If the information is related to measurement, the network (e.g., BS) may indicate an SSB set to be measured within a measurement period, when the UE is in RRC connected mode. The SSB set may be indicated for each frequency layer. Without an indication of an SSB set, a default SSB set is used. The default SSB set includes all SSBs within the measurement period. An SSB set may be indicated by a full bitmap (e.g., of length L) in RRC signaling. When the UE is in RRC idle mode, the default SSB set is used.

In the NR system, a massive multiple input multiple output (MIMO) environment in which the number of transmission/reception (Tx/Rx) antennas is significantly increased may be under consideration. That is, as the massive MIMO environment is considered, the number of Tx/Rx antennas may be increased to a few tens or hundreds. The NR system supports communication in an above 6 GHz band, that is, a millimeter frequency band. However, the millimeter frequency band is characterized by the frequency property that a signal is very rapidly attenuated according to a distance due to the use of too high a frequency band. Therefore, in an NR system operating at or above 6 GHz, beamforming (BF) is considered, in which a signal is transmitted with concentrated energy in a specific direction, not omni-directionally, to compensate for rapid propagation attenuation. Accordingly, there is a need for hybrid BF with analog BF and digital BF in combination according to a position to which a BF weight vector/precoding vector is applied, for the purpose of increased performance, flexible resource allocation, and easiness of frequency-wise beam control in the massive MIMO environment.

Random Access Channel (RACH) Procedure

When a UE first accesses a BS or has no radio resource for signal transmission, the UE may perform a RACH procedure to the BS.

The RACH procedure may be used for various purposes. For example, the RACH procedure may be used for initial network access from RRC_IDLE, an RRC connection re-establishment procedure, handover, UE-triggered UL data transmission, transition from RRC_INACTIVE, time alignment establishment in SCell addition, other system information (OSI) request and beam failure recovery, and so on. The UE may acquire UL synchronization and UL transmission resources from the RACH procedure.

The RACH procedure may be divided into a contention-based RACH procedure and a contention-free RACH procedure. The contention-based RACH procedure may be divided into a 4-step RACH procedure (4-step RACH) and a 2-step RACH procedure (2-step RACH).

(1) 4-Step RACH: Type-1 Random Access Procedure

FIG. 11 is a diagram illustrating an exemplary 4-step RACH procedure.

If the (contention-based) RACH procedure is performed in four steps (i.e., 4-step RACH procedure), the UE may transmit a message (message 1 (Msg1)) including a preamble related to a specific sequence on a physical random access channel (PRACH) (1101) and may receive a response message (random access response (RAR) message) (message 2 (Msg2)) to the preamble on a PDCCH and a PDSCH related thereto (1103). The UE may transmit a message (message 3 (Msg3)) including a PUSCH based on scheduling information in the RAR (1105). The UE may perform a contention resolution procedure by receiving a PDCCH signal and a PDSCH signal related thereto. To this end, the UE may receive a message (message 4 (Msg4)) containing contention resolution information on the contention resolution procedure from the BS (1107).

The 4-step RACH procedure of the UE may be summarized as shown in Table 4 below.

TABLE 4

| | Type of Signals | Operations/Information obtained |
|---|---|---|
| 1st step | PRACH preamble in UL | * Initial beam obtainment<br>* Random selection of RA-preamble ID |
| 2nd step | * Random Access Response on DL-SH | * Timing Advanced information<br>* RA-preamble ID<br>* Initial UL grant, Temporary C-RNTI |
| 3rd step | UL transmission on UL-SCH | * RRC connection request<br>* UE identifier |
| 4th step | Contention Resolution on DL | * Temporary C-RNTI on PDCCH for initial access<br>* C-RNTI on PDCCH for UE in RRC CONNECTED |

First, the UE may transmit a random access preamble over a PRACH in UL as Msg1 of the RACH procedure.

Random access preamble sequences of two different lengths are supported. Long sequence length 839 is applied with SCSs of 1.25 and 5 kHz, and short sequence length 139 is applied with SCSs of 15, 30, 60 and 120 kHz.

Multiple preamble formats are defined by one or more RACH OFDM symbols and different cyclic prefixes (and/or guard times). The RACH configuration for the initial bandwidth of a primary cell (Pcell) may be included in system information of the cell and provided to the UE. The RACH configuration includes information on the SCS of the PRACH, available preambles, preamble formats, and the like. The RACH configuration includes information on association between SSBs and RACH (time-frequency) resources. The UE transmits the random access preamble on a RACH time-frequency resource associated with a detected or selected SSB.

The threshold of SSBs may be configured by the network for association with RACH resources. The RACH preamble may be transmitted or retransmitted based on SSB(s) having reference signal received power (RSRP) measured based thereon satisfying the threshold. For example, the UE may select one of the SSB(s) that satisfy the threshold and transmit or retransmit the RACH preamble based on a RACH resource associated with the selected SSB. For example, upon retransmission of the RACH preamble, the UE may reselect one of the SSB(s) and retransmit the RACH preamble based on a RACH resource associated with the reselected SSB. That is, the RACH resource for retransmission of the RACH preamble may be the same as and/or different from the RACH resource for transmission of the RACH preamble.

When the BS receives a random access preamble from the UE, the BS transmits an RAR message (Msg2) to the UE. A PDCCH scheduling a PDSCH carrying the RAR is cyclic redundancy check (CRC) scrambled with a random access (RA) radio network temporary identifier (RNTI) (RA-RNTI) and then transmitted. Upon detecting the PDCCH CRC-scrambled with the RA-RNTI, the UE may receive the RAR from the PDSCH scheduled by DCI carried on the PDCCH. The UE checks whether the RAR includes RAR information in response to the preamble transmitted by the UE, i.e., Msg1. The presence or absence of the RAR information in response to Msg1 transmitted by the UE may be determined depending on whether there is a random access preamble ID for the preamble transmitted by the UE. If there is no response to Msg1, the UE may retransmit the RACH preamble within a predetermined number of times while performing power ramping. The UE may calculate PRACH transmission power for retransmitting the preamble based on the most recent transmission power, power increment, and power ramping counter.

The RAR information may include a preamble sequence transmitted by the UE, a temporary cell-RNTI (TC-RNTI) allocated by the BS to the UE that has attempted random access, and UL transmit time alignment information, UL transmission power adjustment information, and UL radio resource allocation information. If the UE receives the RAR information for itself on the PDSCH, the UE may obtain timing advance information for UL synchronization, an initial UL grant, a TC-RNTI. The timing advance information may be used to control a UL signal transmission timing. To better align PUSCH/PUCCH transmission by the UE with the subframe timing at the network, the network (e.g., BS) may obtain the timing advance information based on timing information detected from a PRACH preamble received from the UE and transmit the timing advance information to the UE. The UE may transmit a UL signal over a UL shared channel based on the RAR information as Msg3 of the RACH procedure. Msg3 may include an RRC connection request and a UE identifier. In response to Msg3, the network may transmit Msg4, which may be treated as a contention resolution message on DL. Upon receiving Msg4, the UE may enter the RRC_CONNECTED state.

As described above, a UL grant in the RAR may schedule PUSCH transmission to the BS. A PUSCH carrying initial UL transmission based on the UL grant in the RAR is also referred to as a Msg3 PUSCH. The content of an RAR UL grant may start at the MSB and end at the LSB, and the content may be given as shown in Table 5.

TABLE 5

| RAR UL grant field | Number of bits |
|---|---|
| Frequency hopping flag | 1 |
| Msg3 PUSH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

A TPC command is used to determine the transmission power of the Msg3 PUSCH. For example, the TPC command may be interpreted as shown in Table 6.

TABLE 6

| TPC command | value [dB] |
|---|---|
| 0 | −6 |
| 1 | −4 |
| 2 | −2 |
| 3 | 0 |
| 4 | 2 |
| 5 | 4 |
| 6 | 6 |
| 7 | 8 |

(2) 2-Step RACH: Type-2 Random Access Procedure

Figure 12:
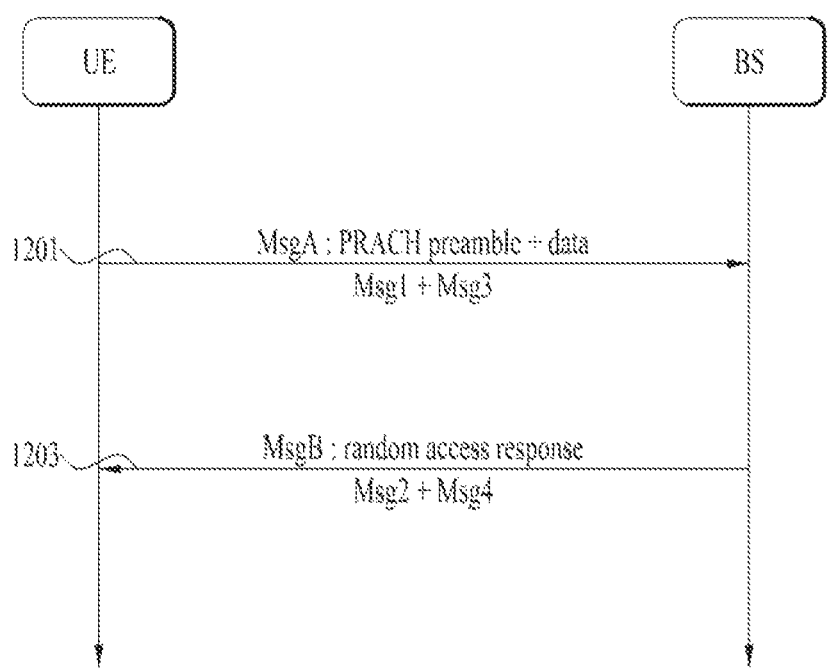
FIG. 12 is a diagram illustrating an exemplary 2-step RACH procedure.

FIG. 12 is a diagram illustrating an exemplary 2-step RACH procedure.

The 2-step RACH procedure in which the (contention-based) RACH procedure is performed in two steps has been proposed to simplify the RACH procedure, that is, to achieve low signaling overhead and low latency.

The operations of transmitting Msg1 and Msg3 in the 4-step RACH procedure may be performed as one operation in the 2-step RACH procedure where the UE transmits one message (message A (MsgA)) including a PRACH and a PUSCH. The operations in which the BS transmits Msg2 and Msg4 in the 4-step RACH procedure may be performed as one operation in the 2-step RACH procedure where the BS transmits one message (message B (MsgB)) including an RAR and contention resolution information.

That is, in the 2-step RACH procedure, the UE may combine Msg1 and Msg3 of the 4-step RACH procedure into one message (e.g., MsgA) and transmit the one message to the BS (1201).

In addition, in the 2-step RACH procedure, the BS may combine Msg2 and Msg4 of the 4-step RACH procedure into one message (e.g., MsgB) and transmit the one message to the UE (S1203).

Based on the combination of these messages, the 2-step RACH procedure may provide a low-latency RACH procedure.

Specifically, MsgA of the 2-step RACH procedure may include a PRACH preamble contained in Msg1 and data contained in Msg3. MsgB of the 2-step RACH procedure may include an RAR contained in Msg2 and contention resolution information contained in Msg4.

(3) Contention-Free RACH

Figure 13:
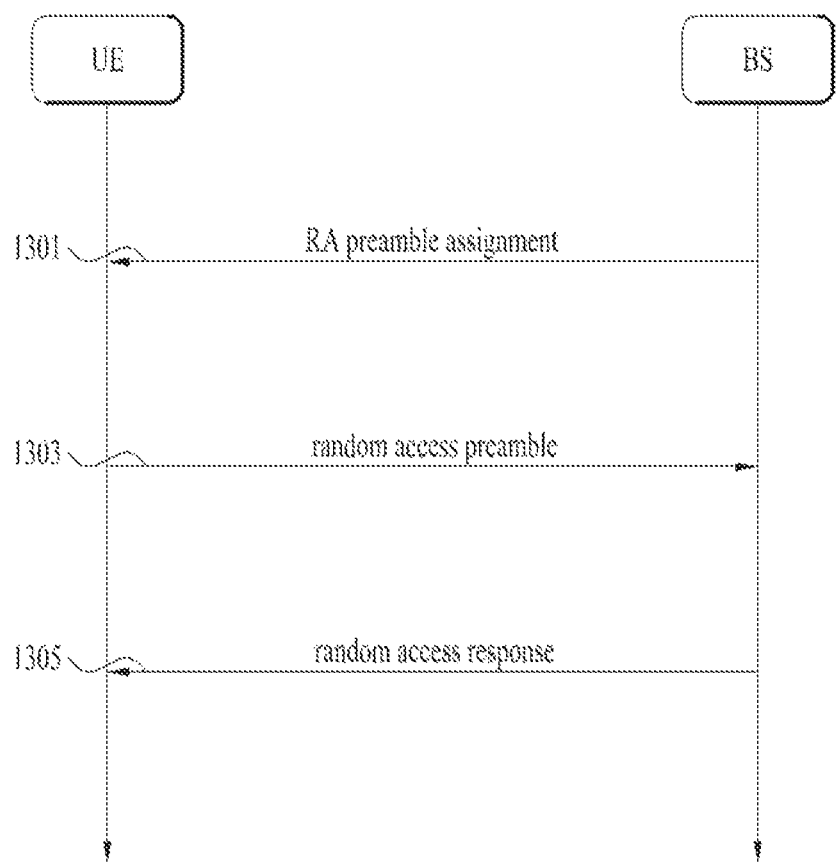
FIG. 13 is a diagram illustrating an exemplary contention-free RACH procedure.

FIG. 13 is a diagram illustrating an exemplary contention-free RACH procedure.

The contention-free RACH procedure may be used when the UE is handed over to another cell or BS or when requested by a command from the BS. The basic steps of the contention-free RACH procedure are similar to those of the contention-based RACH procedure. However, in the contention-free RACH procedure, the BS allocates a preamble to be used by the UE (hereinafter, dedicated random access preamble) to the UE (1301), unlike the contention-based RACH procedure in which the UE arbitrarily selects a preamble to be used from among a plurality of random access preambles. Information on the dedicated random access preamble may be included in an RRC message (e.g., handover command) or provided to the UE through a PDCCH order. When the RACH procedure is initiated, the UE transmits the dedicated random access preamble to the BS (1303). When the UE receives an RAR from the BS, the RACH procedure is completed (1305).

In the contention-free RACH procedure, a CSI request field in an RAR UL grant indicates whether the UE includes an aperiodic CSI report in corresponding PUSCH transmission. The SCS for Msg3 PUSCH transmission is provided by an RRC parameter. The UE may transmit a PRACH and a Msg3 PUSCH on the same UL carrier of the same serving cell. The UL BWP for Msg3 PUSCH transmission is indicated by system information block 1 (SIB1).

(4) Mapping Between SSBs and PRACH Resources (Occasions)

Figure 14:
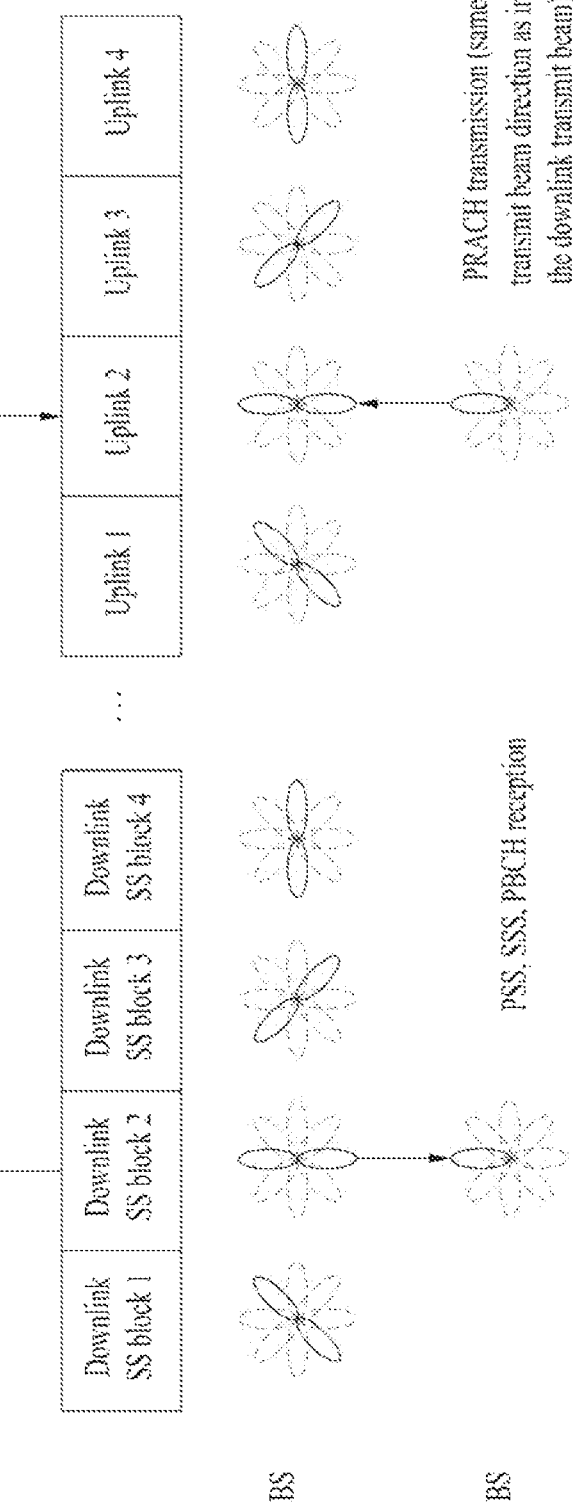
FIG. 14 is a diagram illustrating synchronization signal (SS) block transmission and physical random access channel (PRACH) resources linked to SS blocks.
Figure 15:
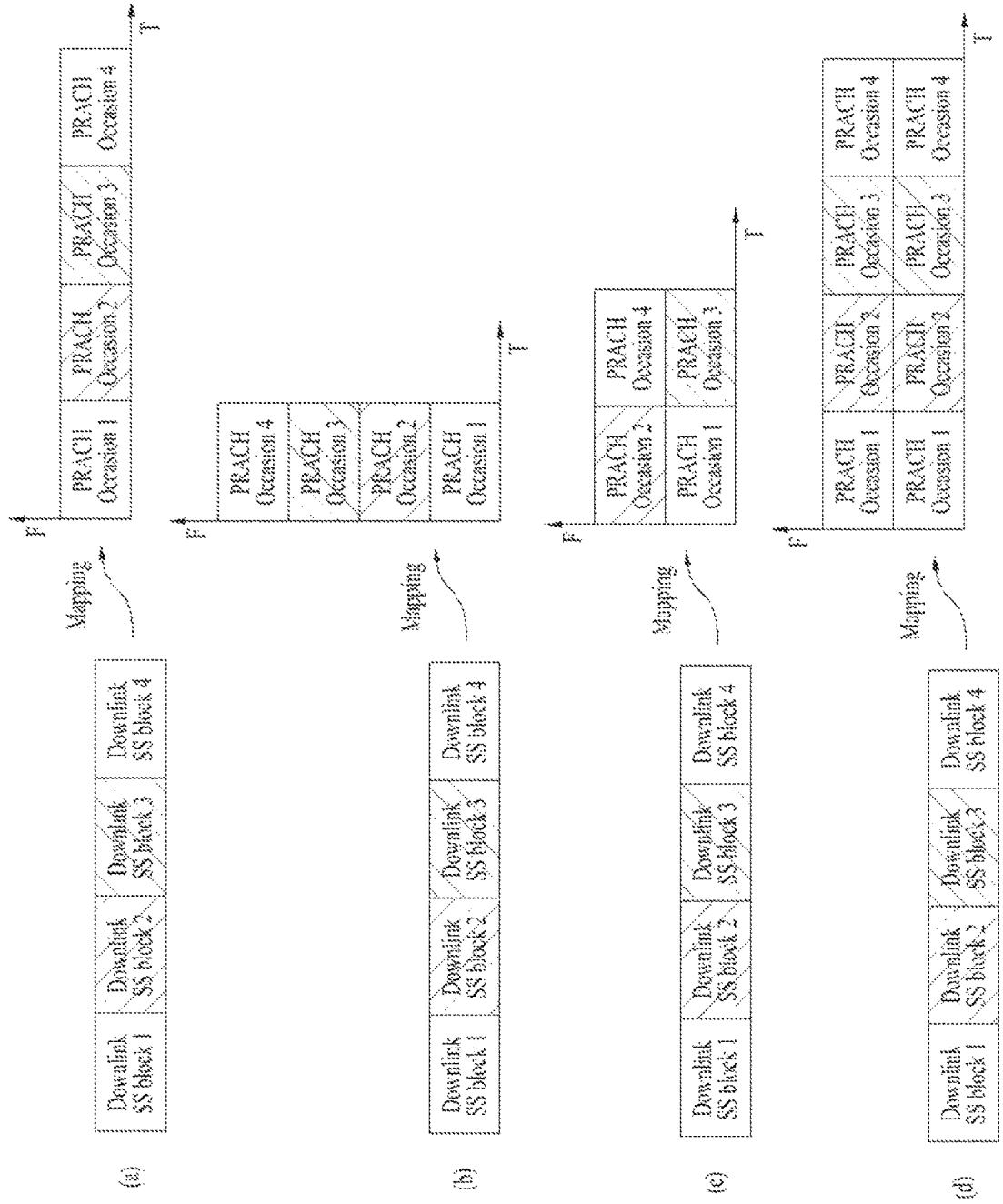
FIG. 15 is a diagram illustrating SS block transmission and PRACH resources linked to SS blocks.

FIGS. 14 and 15 are diagrams illustrating transmission of SSBs and PRACH resources linked to the SSBs according to various embodiments of the present disclosure.

To communicate with one UE, the BS may need to find out what is the optimal beam direction between the BS and UE. Since it is expected that the optimal beam direction will vary according to the movement of the UE, the BS needs to continuously track the optimal beam direction. A process of finding out the optimal beam direction between the BS and UE is called a beam acquisition process, and a process of continuously tracking the optimal beam direction between the BS and UE is called a beam tracking process. The beam acquisition process may be required in the following cases: 1) initial access where the UE attempts to access the BS for the first time; 2) handover where the UE is handed over from one BS to another BS; and 3) beam recovery for recovering beam failure. The beam failure means a state in which while performing the beam tracking to find out the optimal beam between the UE and BS, the UE loses the optimal beam and thus is incapable of maintaining the optimal communication state with the BS or incapable of communicating with the BS.

In the NR system, a multi-stage beam acquisition process is being discussed for beam acquisition in an environment using multiple beams. In the multi-stage beam acquisition process, the BS and UE perform a connection setup by using a wide beam in the initial access stage. After the connection setup is completed, the BS and UE perform the highest quality of communication by using a narrow beam. The beam acquisition process in the NR system applicable to various embodiments of the present disclosure may be performed as follows.

1) The BS transmits a synchronization block for each wide beam to allow the UE to discover the BS in the initial access stage, that is, in order for the UE to find the optimal wide beam to be used in the first stage of the beam acquisition by performing cell search or cell acquisition and measuring the channel quality of each wide beam.

2) The UE performs the cell search on the synchronization block for each beam and acquires a DL beam based on the detection result for each beam.

3) The UE performs a RACH procedure to inform the BS that the UE discovers that the UE intends to access the BS.

4) The BS connects or associates the synchronization block transmitted for each beam with a PRACH resource to be used for PRACH transmission to allow the UE to simultaneously inform the RACH procedure and the DL beam acquisition result (e.g., beam index) at wide beam levels. If the UE performs the RACH procedure on a PRACH resource associated with the optimal beam direction that the UE finds, the BS obtains information on the DL beam suitable for the UE by receiving a PRACH preamble.

In the multi-beam environment, it is a problem whether the UE and/or TRP is capable of accurately determining the directions of a transmission (TX) and/or reception (RX) beam between the UE and TRP. In the multi-beam environment, repetition of signal transmission or beam sweeping for signal reception may be considered based on the TX/RX reciprocal capability of the TRP (e.g., BS) or UE. The TX/RX reciprocal capability of the TRP and UE is also referred to as TX/RX beam correspondence of the TRP and UE. In the multi-beam environment, if the TX/RX reciprocal capability of the TRP and UE is not valid (that is, not held), the UE may not be capable of transmitting a UL signal in the beam direction in which the UE receives a DL signals. This is because the UL optimal path may be different from the DL optimal path. The TX/RX beam correspondence of the TRP may be valid (held) if the TRP is capable of determining a TRP RX beam for UL reception based on DL measurements measured by the UE for one or more TX beams of the TRP and/or if the TRP is capable of determining a TRP TX beam for DL transmission based on UL measurements measured by the TRP for one or more RX beams of the TRP. The TX/RX beam correspondence of the UE may be valid (held) if the UE is capable of determining a UE RX beam for UL transmission based on DL measurements measured by the UE for one or more RX beams of the UE and/or if the UE is capable of determining a UE TX beam for DL reception based on an indication from the TRP, which is related to UL measurements for one or more TX beams of the UE.

(5) PRACH Preamble Structure

In the NR system, a RACH signal used for initial access to the BS, that is, initial access to the BS through a cell used by the BS may be configured based on the following elements.

Cyclic prefix (CP): The CP serves to prevent interference from previous (OFDM) symbols and bundle PRACH preamble signals arriving at the BS with various time delays in one same time zone. That is, if the CP is configured to match the maximum radius of a cell, PRACH preambles transmitted by UEs in the cell on the same resource may be within a PRACH reception window having a PRACH preamble length configured by the BS for PRACH reception. The length of the CP is generally set greater than or equal to the maximum round trip delay. The CP may have a length of TCP.

Preamble (sequence): A sequence may be defined for the BS to detect signal transmission, and the preamble serves to carry this sequence. The preamble sequence may have a length of TSEQ.

Guard time (GT): The GT is a time duration defined to prevent a PRACH signal that is transmitted from the point farthest from the BS in PRACH coverage and received by the BS with a delay from interfering with a signal that is received after a PRACH symbol duration. Since the UE transmits no signal in the GT period, the GT may not be defined as a PRACH signal. The GT may have a length of TGP.

(6) Mapping to Physical Resources for Physical Random-Access Channel

Random access preambles may be transmitted only on time resources obtained based on predetermined tables (RACH configuration tables) for RACH configurations, frequency range 1 (FR1), frequency range 2 (FR2), and predetermined spectrum types.

The PRACH configuration index in RACH configuration tables may be given as follows.

For a RACH configuration table for random access configurations for FR1 and unpaired spectrum, the PRACH configuration index may be given by a higher layer parameter prach-ConfigurationIndexNew (if configured). Otherwise, the PRACH configuration index may be given by prach-ConfigurationIndex, msgA-prach-ConfigurationIndex, or msgA-prach-ConfigurationIndexNew (if configured).

For a RACH configuration table for random access configurations for FR1 and paired spectrum/supplementary uplink and a RACH configuration table for random access configurations for FR2 and unpaired spectrum, the PRACH configuration index may be given by a higher layer parameter prach-ConfigurationIndex or msgA-prach-ConfigurationIndexNew (if configured).

For each case, the RACH configuration table may show relationships between one or more of the following parameters: PRACH configuration index, preamble format, $n_{SFN}$ mod x=y, subframe number, starting symbol, number of PRACH slots, number of time-domain PRACH occasions within a PRACH slot, and PRACH duration.

Each case may be:

(1) Random access configurations for FR1 and paired spectrum/supplementary uplink;

(2) Random access configurations for FR1 and unpaired spectrum; or (3) Random access configurations for FR2 and unpaired spectrum.

Table 7 below shows a part of the RACH configuration table for (2) random access configurations for FR1 and unpaired spectrum.

TABLE 7

| PRACH Configuration Index | Preamble format | $n_{SFN}$ mod x = y | | Subframe number | Starting symbol | Number of PRACH slots within a subframe | $N_t^{RAslot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 9 | 0 | — | — | 0 |
| 1 | 0 | 8 | 1 | 9 | 0 | — | — | 0 |
| 2 | 0 | 4 | 1 | 9 | 0 | — | — | 0 |
| 3 | 0 | 2 | 0 | 9 | 0 | — | — | 0 |
| 4 | 0 | 2 | 1 | 9 | 0 | — | — | 0 |
| 5 | 0 | 2 | 0 | 4 | 0 | — | — | 0 |
| 6 | 0 | 2 | 1 | 4 | 0 | — | — | 0 |
| 7 | 0 | 1 | 0 | 9 | 0 | — | — | 0 |
| 8 | 0 | 1 | 0 | 8 | 0 | — | — | 0 |
| 9 | 0 | 1 | 0 | 7 | 0 | — | — | 0 |

The RACH configuration table shows specific values for parameters (e.g., preamble format, periodicity, SFN offset, RACH subframe/slot index, starting OFDM symbol, number of RACH slots, number of occasions, OFDM symbols for RACH format, etc.) required to configure RACH occasions. When the RACH configuration index is indicated, specific values related to the indicated index may be used.

For example, when the starting OFDM symbol parameter is n, one or more consecutive (time-domain) RACH occasions may be configured from an OFDM symbol having index #n.

For example, the number of one or more RACH occasions may be indicated by the following parameter: number of time-domain PRACH occasions within a RACH slot.

For example, a RACH slot may include one or more RACH occasions.

For example, the number of RACH slots (in a subframe and/or slot with a specific SCS) may be indicated by the parameter: number of RACH slots.

For example, a system frame number (SFN) including RACH occasions may be determined by $n_{SFN}$ mod x=y, where mod is a modular operation (modulo arithmetic or modulo operation) which is an operation to obtain remainder r obtained by dividing dividend q by divisor d (r=q mod (d)).

For example, a subframe/slot (index) including RACH occasions in a system frame may be indicated by the parameter: RACH subframe/slot index.

For example, a preamble format for RACH transmission/reception may be indicated by the parameter: preamble format.

Figure 16:
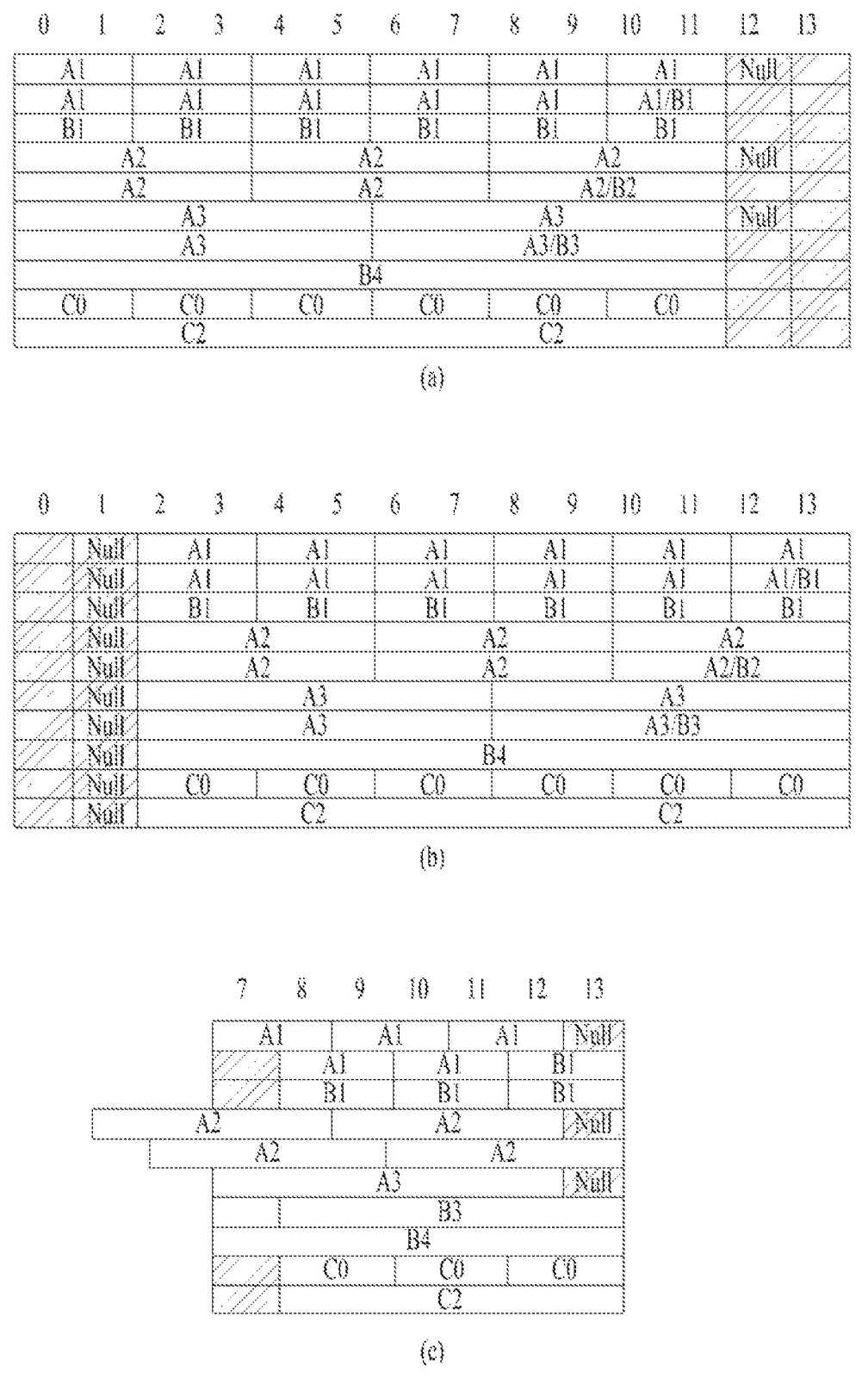

Referring to FIG. 16(a), for example, when the starting OFDM symbol is indicated as 0, one or more consecutive (time-domain) RACH occasions may be configured from OFDM symbol #0. For example, the number of one or more RACH occasions may depend on a value indicated by the parameter: number of time-domain RACH occasions within a RACH slot. For example, the preamble format may be indicated by the parameter: preamble format. For example, preamble formats A1, A2, A3, B4, C0, C2, etc. may be indicated. For example, one of the last two OFDM symbols may be used as the GT, and the other may be used for transmission of other UL signals such as a PUCCH, a sounding reference signal (SRS), etc.

Referring to FIG. 16(b), for example, when the starting OFDM symbol is indicated by 2, one or more consecutive (time-domain) RACH occasions may be configured from OFDM symbol #2. For example, 12 OFDM symbols may be used for a RACH occasion, and no GT may be configured in the last OFDM symbol. For example, the number of one or more RACH occasions may depend on a value indicated by the parameter: number of time-domain RACH occasions within a RACH slot. For example, the preamble format may be indicated by the parameter: preamble format. For example, preamble formats A1/B1, B1, A2/B2, A3/B3, B4, C0, C2, etc. may be indicated.

Referring to FIG. 16(c), for example, when the starting OFDM symbol is indicated as 7, one or more consecutive (time-domain) RACH occasions may be configured from OFDM symbol #7. For example, 6 OFDM symbols may be used for an RACH occasion, and the last OFDM symbol (OFDM symbol #13) may be used for transmission of other UL signals such as a PUCCH, an SRS, etc. For example, the number of one or more RACH occasions may depend on a value indicated by the parameter: number of time-domain RACH occasions within a RACH slot. For example, the preamble format may be indicated by the parameter: preamble format. For example, preamble formats A1, B1, A2, A3, B3, B4, C0, C2, etc. may be indicated.

For example, the parameters included in the RACH configuration table may satisfy predetermined correspondence relationships identified/determined by the RACH configuration table and the RACH configuration index. For example, the predetermined correspondence relationships may be satisfied between the following parameters: PRACH configuration index, RACH format, period (x)=8, SFN offset (y), subframe number, starting symbol (index), number of PRACH slots within a subframe, number of PRACH occasions within a PRACH slot, PRACH duration/OFDM symbols for RACH format, etc. The correspondence relationships may be identified by the RACH configuration index and the RACH configuration table.

Hereinafter, methods for performing the RACH procedure according to embodiments of the present disclosure will be described.

Figure 17:
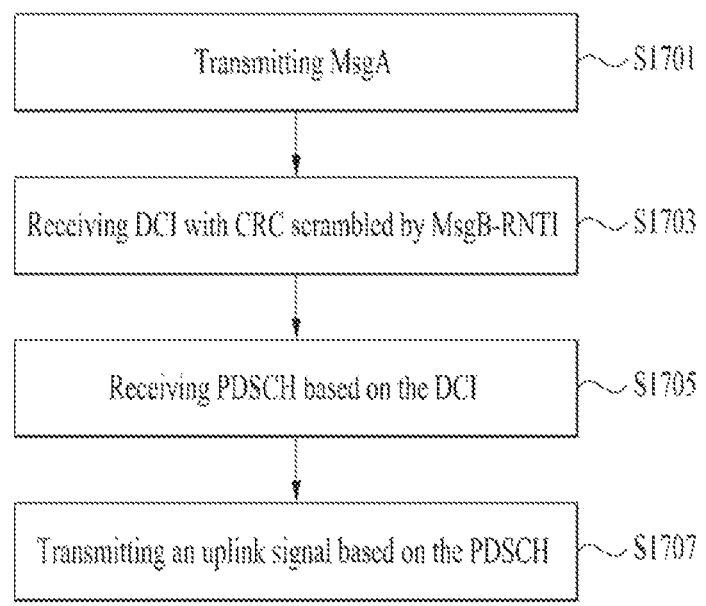
FIGS. 17 to 19 are diagrams for explaining operations of a user equipment (UE) and a base station (BS) according to embodiments of the present disclosure.
Figure 18:
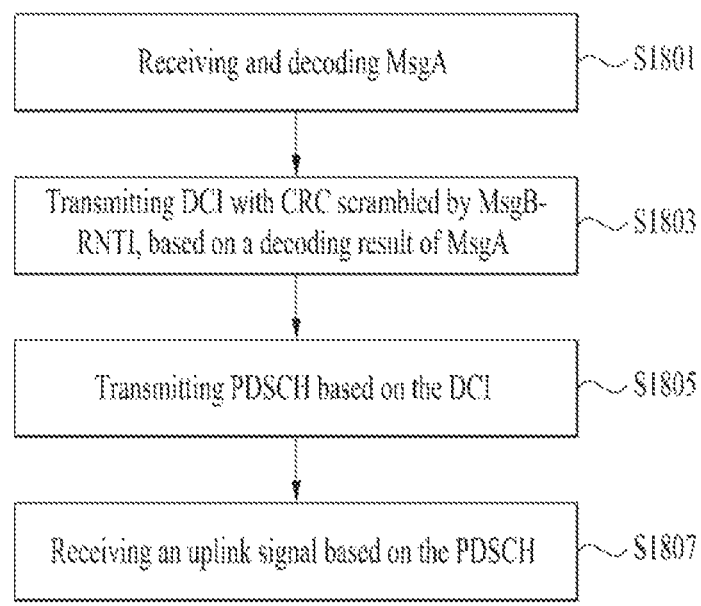
Figure 19:
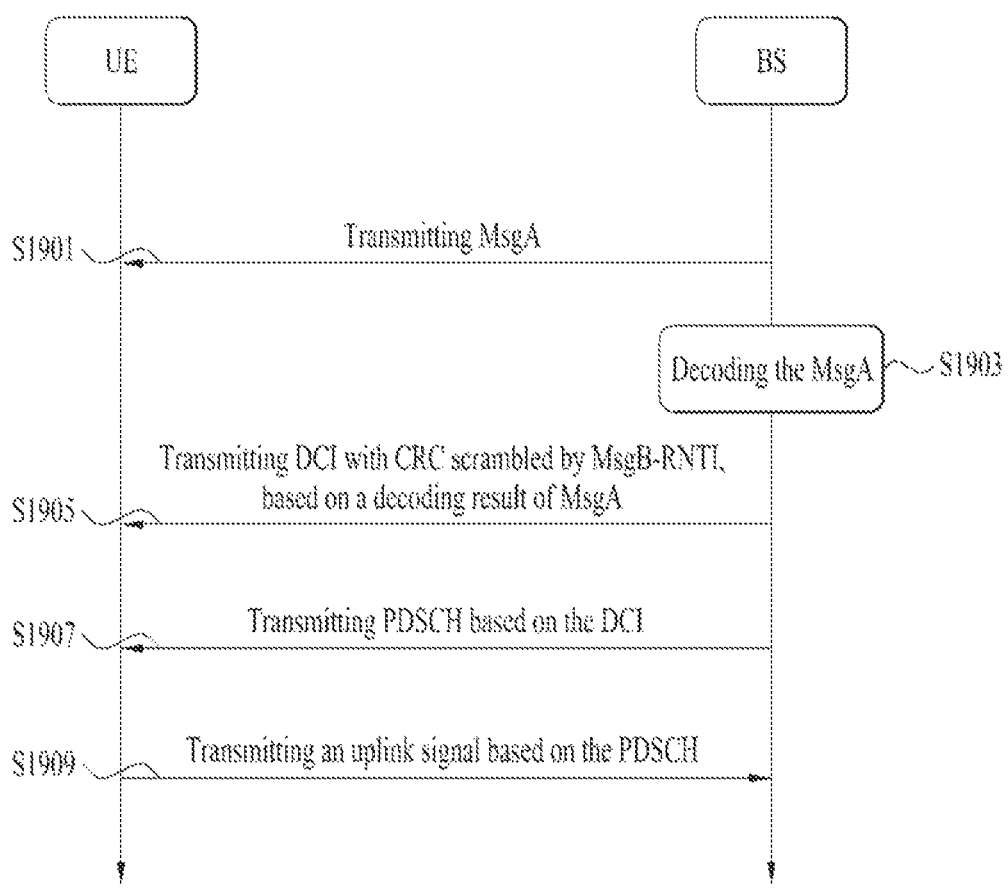

With reference to FIGS. 17 to 19, overall operation processes of the UE and BS according to embodiments of the present disclosure will be described.

FIG. 17 illustrates the overall operation process of the UE according to an embodiment of the present disclosure.

Referring to FIG. 17, the UE may transmit MsgA to the BS (S1701). In this case, MsgA may include only a PRACH or may include a PUSCH as well as the PRACH. When MsgA includes both the PRACH and PUSCH, the UE may transmit the PUSCH after transmitting the PRACH.

In this case, the UE may transmit the PRACH while knowing an SFN for transmitting the PRACH. Alternatively, the UE may transmit the PRACH without knowing the SFN for transmitting the PRACH. Details thereof will be described in the following embodiments.

The UE may monitor and receive DCI scheduling MsgB (S1703). The UE may descramble a CRC from the DCI based on a MsgB-RNTI. If the UE confirms the CRC, the UE may decode information bits included in the DCI.

The UE may decode lower two bits for the index of an SFN in the DCI and then compare the lower two bits with lower two bits for the index of the SFN for transmitting the PRACH.

However, if the UE transmits the PRACH without knowing the SFN for transmitting the PRACH, the UE may not compare the lower two bits for the SFN included in the DCI and the lower two bits for the SFN for transmitting the PRACH. For example, in general, when the UE performs handover, the UE may need to perform a PBCH decoding process to obtain the SFN of a target cell to be handed over. However, the RACH procedure may be performed with no PBCH decoding to reduce the time delay due to the PBCH decoding and a burden on the UE due to the PBCH decoding. In this case, when the UE intends to the PRACH to the target cell, the UE may transmit the PRACH without knowing the SFN for the PRACH transmission.

This will be described in detail in the following embodiments.

The UE may receive a PDSCH for an RAR based on the DCI (S1705). In this case, the UE may receive the PDSCH according to the result of comparing the lower two bits for the SFN included in the DCI and the lower two bits for the SFN for transmitting the PRACH. On the other hand, the UE may receive the PDSCH regardless of the result of comparing the lower two bits for the SFN included in the DCI and the lower two bits for the SFN for transmitting the PRACH.

In addition, the UE may receive the PDSCH or perform other operations instead of receiving the PDSCH, depending on whether the UE is capable of comparing the lower two bits for the SFN included in DCI and the lower two bits for the SFN for transmitting the PRACH and/or according to the comparison result.

The UE operations depending on whether the UE is capable of comparing the lower two bits for the SFN included in the DCI and the lower two bits for the SFN for transmitting the PRACH and/or according to the comparison result may be based on the following embodiments.

The UE may transmit a UL signal based on the PDSCH (S1707). In this case, the UL signal transmitted by the UE may vary depending on the RAR of the PDSCH and depending on whether the PDSCH is received. For example, if the RAR is a fallback RAR, the UE may transmit the PRACH for the Type-1 RACH procedure. As another example, if the RAR is a success RAR, the UE may transmit a PUCCH by including HARQ-ACK information corresponding to an ACK in the PUCCH.

If the UE does not receive the PDSCH, the UE may transmit the PRACH according to the Type-1 RACH procedure or transmit (or retransmit) the PRACH and PUSCH according to the Type-2 RACH procedure.

The above-described UE operations according to S1701 to S1707 may be based on one or more of the following embodiments. That is, the UE operations according to S1701 to S1707 may be performed based on any one of the following embodiments or any combination of two or more of the following embodiments.

FIG. 18 is a diagram for explaining the overall operation process of the BS according to an embodiment of the present disclosure.

Referring to FIG. 18, the BS may receive MsgA from the UE (S1801). In this case, MsgA may include only a PRACH or may include a PUSCH as well as the PRACH. When MsgA includes both the PRACH and PUSCH, the BS may receive the PUSCH after receiving the PRACH.

The BS may decode MsgA and transmit DCI having a CRC scrambled by a MsgB-RNTI to the UE based on the decoding result (S1803).

The BS may transmit a PDSCH for an RAR based on the DCI (S1805). If the BS detects both the PRACH and PUSCH in S1801, the RAR may be a success RAR. If the BS detects only the PRACH and does not detect the PUSCH in S1801, the RAR may be a fallback RAR. If the BS does not detect both the PRACH and PUSCH in S1801, the BS may not transmit both the DCI and PDSCH. That is, in this case, S1803 and S1805 may be omitted.

If the BS transmits the PDSCH, the BS may receive a UL signal based on the PDSCH (S1807). In this case, the UL signal may vary depending on the RAR of the PDSCH and depending on whether the UE receives the PDSCH. For example, if the RAR is the fallback RAR, the BS may receive the PRACH for the Type-1 RACH procedure. As another example, if the RAR is the success RAR, the BS may receive a PUCCH including HARQ-ACK information corresponding to an ACK.

If the UE does not receive the PDSCH, the BS may receive the PRACH according to the Type-1 RACH procedure or receive (or receive again) the PRACH and PUSCH according to the Type-2 RACH procedure.

The above-described BS operations according to S1801 to S1807 may be based on one or more of the following embodiments. That is, the BS operations according to S1801 to S1807 may be performed based on any one of the following embodiments or any combination of two or more of the following embodiments.

FIG. 19 is a diagram for explaining an overall operation process of a network according to an embodiment of the present disclosure.

Referring to FIG. 19, the UE may transmit MsgA to the BS (S1901). In this case, MsgA may include only a PRACH or may include a PUSCH as well as the PRACH. When MsgA includes both the PRACH and PUSCH, the UE may transmit the PUSCH after transmitting the PRACH.

In this case, the UE may transmit the PRACH while knowing an SFN for transmitting the PRACH. Alternatively, the UE may transmit the PRACH without knowing the SFN for transmitting the PRACH. Details thereof will be described in the following embodiments.

The BS may decode received MsgA (S1903) and transmit DCI having a CRC scrambled by a MsgB-RNTI to the UE based on the decoding result (S1905).

The UE may monitor and receive the DCI scheduling MsgB (S1703). The UE may descramble the CRC from the DCI based on the MsgB-RNTI. If the UE confirms the CRC, the UE may decode information bits included in the DCI.

The UE may decode lower two bits for the index of an SFN in the DCI and then compare the lower two bits with lower two bits for the index of the SFN for transmitting the PRACH.

However, if the UE transmits the PRACH without knowing the SFN for transmitting the PRACH, the UE may not compare the lower two bits for the SFN included in the DCI and the lower two bits for the SFN for transmitting the PRACH. For example, in general, when the UE performs handover, the UE may need to perform PBCH decoding to obtain the SFN of a target cell to be handed over. However, the RACH procedure may be performed with no PBCH decoding to reduce the time delay caused by the PBCH decoding and a burden on the UE due to the PBCH decoding. In this case, when the UE intends to transmit the PRACH to the target cell, the UE may transmit the PRACH without knowing the SFN for the PRACH transmission.

This will be described in detail in the following embodiments.

The BS may transmit a PDSCH for an RAR based on the DCI (S1907). If the BS detects both the PRACH and PUSCH in S1903, the RAR may be a success RAR. If the BS detects only the PRACH and does not detect the PUSCH in S1903, the RAR may be a fallback RAR. If the BS does not detect both the PRACH and PUSCH in S1903, the BS may not transmit the DCI and PDSCH. That is, in this case, S1905 and S1907 may be omitted. In this case, the UE may transmit (or retransmit) MsgA to the BS.

The UE may receive the PDSCH according to the result of comparing the lower two bits for the SFN included in the DCI and the lower two bits for the SFN for transmitting the PRACH. On the other hand, the UE may receive the PDSCH regardless of the result of comparing the lower two bits for the SFN included in the DCI and the lower two bits for the SFN for transmitting the PRACH.

In addition, the UE may receive the PDSCH or perform other operations without receiving the PDSCH, depending on whether the UE is capable of comparing the lower two bits for the SFN included in DCI and the lower two bits for the SFN for transmitting the PRACH and/or according to the comparison result.

The UE operations depending on whether the UE is capable of comparing the lower two bits for the SFN included in the DCI and the lower two bits for the SFN for transmitting the PRACH and/or according to the comparison result may be based on the following embodiments.

The UE may transmit a UL signal based on the PDSCH (S1909). In this case, the UL signal transmitted by the UE may vary depending on the RAR of the PDSCH and depending on whether the PDSCH is received. For example, if the RAR is the fallback RAR, the BS may transmit the PRACH for the Type-1 RACH procedure. As another example, if the RAR is the success RAR, the BS may transmit a PUCCH by including HARQ-ACK information corresponding to an ACK in the PUCCH.

If the UE does not receive the PDSCH, the UE may transmit the PRACH according to the Type-1 RACH procedure or transmit (or retransmit) the PRACH and PUSCH according to the Type-2 RACH procedure.

The above-described UE operations according to S1901 to S1909 may be based on one or more of the following embodiments. That is, the UE operations according to S1901 to S1909 may be performed based on any one of the following embodiments or any combination of two or more of the following embodiments.

Hereinafter, particular embodiments of the present disclosure will be described based on FIGS. 17 to 19.

1. Embodiment 1

In the 2-step RACH procedure, the following three cases may be considered for network operations depending on whether the BS successfully receives MsgA.

Case 1: When the BS successfully detects both a PRACH preamble and a PUSCH, the BS may transmit MsgB to the UE.

Case 2: When the BS detects only a PRACH preamble and fails to detect a PUSCH, the BS may transmit a fallback RAR instructing the UE to perform the 4-step RACH procedure.

The BS may include a message instructing Msg3 transmission of the 4-step RACH procedure in MsgB to transmit the message to the UE. The UE may monitor a PDCCH for MsgB and receive the PDCCH related to MsgB. In addition, the UE may decode a PDSCH related to the PDCCH and then obtain an indicator for UE operations.

For example, when the UE receives Msg3 of the 4-step RACH procedure, the UE may transmit a PUSCH after a predetermined time.

Case 3: When the BS fails to detect a PRACH preamble, the BS may not transmit an RAR or MsgB to the UE. The UE may transmit (or retransmit) MsgA if the UE fails to receive the RAR or MsgB for a predetermined period of time (e.g., monitoring window for MsgB reception). On the other hand, when the BS fails to detect the PRACH preamble, the BS may attempt to detect a PUSCH. However, the BS may not attempt to detect the PUSCH.

Meanwhile, in Case 1 and/or Case 2, an RNTI (e.g., TC-RNTI) may be required to monitor the PDCCH for MsgB. However, it may be difficult to allocate a TC-RNTI to the UE that intends to perform PDCCH monitoring. Therefore, it is necessary to study whether TC-RNTI based PDCCH monitoring is required. If necessary, a method for allocating a TC-RNTI needs to be studied. In addition, it is also necessary to study whether a TC-RNTI is commonly used for a group of UEs or is allocated to each UE.

To this end, an RNTI used by the UE to monitor the PDCCH for MsgB may be defined. Such an RNTI may be provided in the RAR. When the UE transmits a PRACH preamble and the BS detects the PRACH preamble, the BS may transmit to the UE a response (e.g., RAR) for a random access procedure identity (RAPID) related to the detected PRACH preamble. In this case, the BS may include information on the RNTI related to the RAPID in the RAR to transmit the information on the RNTI to the UE. If the UE checks the RAPID, which was transmitted by the UE, from the RAR and also checks the RNTI related to the RAPID, the UE may transmit UL data such as a PUSCH based on the TC-RNTI or may monitor the PDCCH for MsgB or a PDCCH for other DL data (e.g., PDSCH). In addition, the UE may use the corresponding RNTI as the initialization seed value of a scrambling sequence for UL data.

To generate the RNTI for monitoring the PDCCH for MsgB, Equation 1, which is used to generate an RA-RNTI related to a specific RACH occasion (RO), may be used.

$$RA\_RNTI = 1 + s\_id + 14 * t\_id + 14 * 80 * f\_id + 14 * 80 * 8 * ul\_carrier\_id \quad \text{[Equation 1]}$$

In Equation 1, $s\_id$ denotes the first OFDM symbol index of a transmitted PRACH and has a value of $0 \leq s\_id < 14$.

In Equation 1, $t\_id$ denotes the first slot index in a system frame of the transmitted PRACH and has a value of $0 \leq t\_id < 80$.

In Equation 1, $f\_id$ denotes the index of the PRACH in the frequency domain and has a value of $0 \leq f\_id < 8$.

In Equation 1, $ul\_carrier\_id$ denotes the indicator for a UL carrier. Specifically, $ul\_carrier\_id$ has a value of '0' if the UL carrier is a normal carrier and has a value of '1' if the UL carrier is a supplemental uplink (SUL) carrier.

According to embodiments of the present disclosure, when a 2-step PRACH preamble is transmitted on an RO, a TC-RNTI related to the corresponding RO or a new RNTI may be defined. As a parameter for this, an RNTI may be generated by applying a predetermined offset to a parameter related to a time resource to which the RO is mapped. For example, there are actually unused indices and used indices among indices for s_id and/or t_id of Equation 1. Accordingly, indices other than those used for s_id and/or t_id where the corresponding RO is mapped may be used.

For example, if an RA-RNTI of the 4-step RACH procedure is generated based on a slot index and an OFDM symbol starting position (or starting OFDM symbol index) included in a RACH configuration table, an RNTI of the 2-step RACH procedure may be generated by applying a predetermined offset to the slot index and the OFDM symbol starting position (or starting OFDM symbol index) included in the RACH configuration table.

For example, a PRACH preamble based on a short sequence may consist of at least two OFDM symbols. For PRACH preamble format A1, OFDM symbol index 0, 2, 4, 6, 8 or 10 may be used for the RA-RNTI of the 4-step RACH procedure, and OFDM symbol index 1, 3, 5, 7, 9 or 11 may not be used. Accordingly, OFDM symbol index 1, 3, 5, 7, 9 or 11 may be used to generate the RNTI of the 2-step RACH procedure.

Meanwhile, a slot index may be used to generate the RNTI of the 2-step RACH procedure. Even if the RACH configuration duration is 10 ms for both the 2-step RACH and 4-step RACH procedures, for the RA-RNTI of the 4-step RACH procedure, only slot index 0, 2, 4, 6 or 8 are used at intervals of 2 ms based on 15 kHz slots. Therefore, slot index 1, 3, 5, 7 or 9 may be used for the RNTI of the 2-step RACH procedure.

That is, the RNTI of the 2-step RACH procedure may be generated by selecting a value not used for generating the RNTI of the 4-step RACH procedure from at least one of s_id and t_id. In this case, considering Lid, at least 8 different RNTIs may be generated.

As another example, if the transmission times of the 2-step PRACH preamble and the 4-step PRACH preamble are divided in units of subframes, more RNTIs may be generated for 2-step RACH procedure. For example, if a duration of 20 ms is used for the RACH configuration, the first half of 10 ms may be used for the 4-step RACH procedure (or 2-step RACH procedure), and the latter half of 10 ms may be used for the 2-step RACH procedure (or 4-step RACH procedure).

On the other hand, when the 2-step RACH procedure and the 4-step RACH procedure share the same RO, a slot index indicated by the RACH configuration may be used to generate the RA-RNTI of the 4-step RACH procedure, and a specific offset may be applied to the slot index indicated by the RACH configuration to generate the 2-step RACH RNTI.

For example, assuming that slot indices 0 to 79 are supported for the RACH generation, if the SCS is 15 kHz or 30 kHz in FR1, slot indices 0 to 39 may be used for the 4-step RACH procedure, and slot indices 40 to 79 may be used for the 2-step RACH procedure.

If it is indicated that the RACH slot index for the 4-step RACH procedure is 0, 2, 4, 6 or 8, slot index 1, 3, 5, 7 or 9 may be used to generate the RNTI of the 2-step RACH procedure.

In addition, slot indices 0 to 9 may be used for the RACH slot with an SCS of 15 kHz, and slot indices 0 to 39 may be used for the RACH slot with an SCS of 60 kHz. In this case, if an SCS of 30/120 kHz is indicated, only one of two slots included in the 15/60 kHz SCS slots may be used to generate the RA-RNTI of the 4-step RACH procedure. In this case, the remaining one slot index may be used to generate the RNTI of the 2-step RACH procedure.

As another example, the 2-step RNTI and the 4-step RA-RNTI may be generated with different values as follows: a slot index and/or OFDM symbol index for generating the RA-RNTI of the 4-step RACH procedure may be maintained for a specific time duration, and a different slot index and/or OFDM symbol index may be used for the RA-RNTI of the 2-step RACH procedure. Here, the time duration used for generating the 2-step RNTI procedure may be after the time duration for generating the RA-RNTI of the 4-step RACH procedure.

Figure 20:
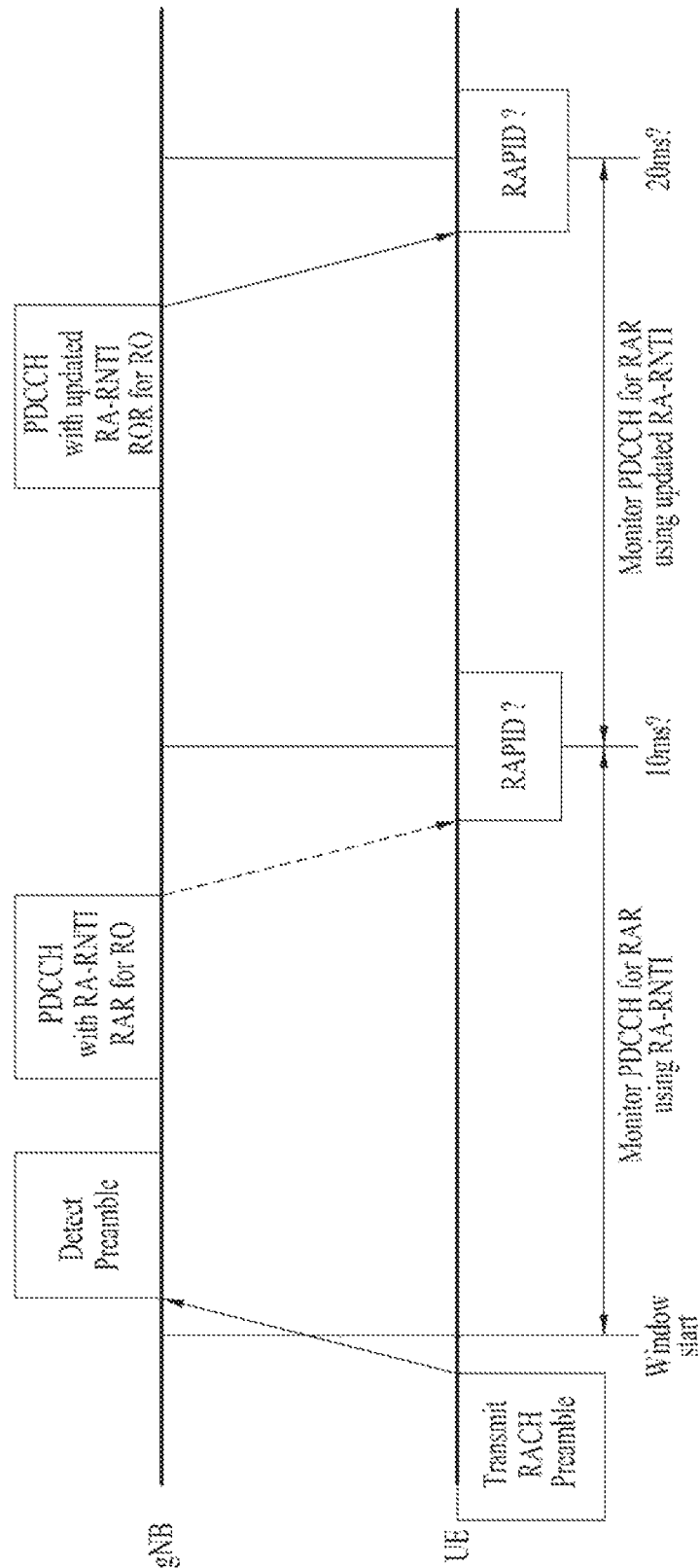
FIGS. 20 to 22 are diagrams for explaining methods of monitoring downlink control information (DCI) for message B (MsgB) transmission according to embodiments of the present disclosure.

On the other hand, if the maximum length of an RAR window is 10 ms, a contention resolution timer for receiving Msg4 may be configured to operate for a time duration longer than 10 ms. For example, referring to FIG. 20, when the length of the RAR window is 10 ms, the contention resolution timer may have a length of 20 ms including two RAR windows. In this case, if a TC-RNTI related to an RO or a new RNTI is created, the TC-RNTI or the new RNTI may overlap every 10 ms. In order to solve this problem, a time offset value applied to the RO may vary every 10 ms.

As another example, the UE may generate an RA-RNTI based on an RO at the time of transmitting a PRACH preamble. Thereafter, the UE may monitor a PDCCH based on the corresponding RA-RNTI. In this case, the PDCCH to be monitored may be for an RAR or MsgB.

As another example, the UE may recalculate the RA-RNTI for monitoring the PDCCH related to the RO after a lapse of a predetermined time (e.g., 10 ms) from the time at which the UE monitored the PDCCH. To generating an RA-RNTI different from the previous RA-RNTI, the above-described method using slot indices or OFDM symbol indices may be considered.

On the other hand, the above-described method is not limitedly applied to PDCCH monitoring of the 2-step RACH procedure. That is, the method may be applied even when a time duration (e.g., monitoring window) for PDCCH monitoring of the 4-step RACH procedure becomes longer than a predetermined level. For example, considering that PDCCH transmission may be delayed due to Listen-Before-Talk (LBT) in unlicensed bands, the above-described method may be considered when the RAR monitoring window of the 4-step RACH procedure increases to 10 ms or more.

As another example, the UE may initially generate an RA-RNTI by substituting slot indices on an RO with slot indices in a time duration of 20 ms or more. For example, for the 15 kHz SCS, the UE may substitute slots included in two frames with slot indices 0 to 19 and use the slot indices to generate the RA-RNTI. To this end, the UE needs to know exactly the starting and ending points of the time duration of 20 ms or more. However, when the UE performs handover in an asynchronous network, the UE needs to obtain SFN information on a target cell in order to secure the boundary of a time duration longer than the 10 ms duration of the target cell. Since the corresponding information is included in a PBCH, the UE needs to decode the PBCH to obtain the SFN information on the target cell. Therefore, to implement this embodiment, the possibility that latency may occur due to PBDH decoding during handover also needs to be considered.

The 2-step RACH procedure and the 4-step RACH procedure may share the same RO. In this case, a UE performing the 2-step RACH procedure and a UE performing the 4-step RACH procedure may each monitor an RAR. An RA-RNTI used for RAR monitoring may be determined according to the RO. In addition, the UE performing the 2-step RACH procedure needs to monitor MsgB. However, an RNTI for monitoring MsgB needs to be different from the RNTI for the RAR. For the RNTI for MsgB monitoring, the existing RA-RNTI generation equation may be reused. For example, the RNTI for MsgB may be generated by the above-described embodiments including the embodiment based on Equation 1.

In the following, the RNTI generation method described in the examples of Embodiment 1 and examples to which the RNTI generation method are applicable will be summarized.

(1) Usage 1: The RNTI generation method may be used to distinguish the RA-RNTI of the 2-step RACH procedure and the RA-RNTI of the 4-step RACH procedure.

(2) Usage 2: In the 2-step RACH procedure, both an RAR and MsgB needs to be monitored. Accordingly, Embodiment 1 may be used to distinguish an RA-RNTI for RAR monitoring and an RNTI for msgB monitoring.

(3) Usage 3: When the length of a PDCCH monitoring window exceeds 10 ms, the RNTI generation method may be used to distinguish an RA-RNTI used for RAR monitoring on an RO at a specific time point and an RA-RNTI used for RAR monitoring on an RO having the same OFDM symbol, slot, and frequency position as the RO at the specific time point but having an offset of 10 ms.

Usage 3 may be applied to the following scenarios.

1) For transmission in an unlicensed band, it may be difficult to obtain an occasion to transmit a PDCCH due to the LBT, and thus the length of a PDCCH monitoring window may be configured to exceed 10 ms. For example, the length of the PDCCH monitoring window may be set to 20 ms, 30 ms, or 40 ms.

2) The size of a MsgB monitoring window of the 2-step RACH procedure may exceed 10 ms.

3) If RA-RNTIs for MsgB monitoring in the 2-step RACH procedure are generated in groups of PUSCH occasions to which a specific RO is mapped (e.g., UL time and frequency resources for MsgA PUSCH transmission), the RNTI generation method may be used to distinguish an RA-RNTI related to a specific PUSCH occasion group from an RA-RNTI related to another PUSCH occasion group.

Figure 21:
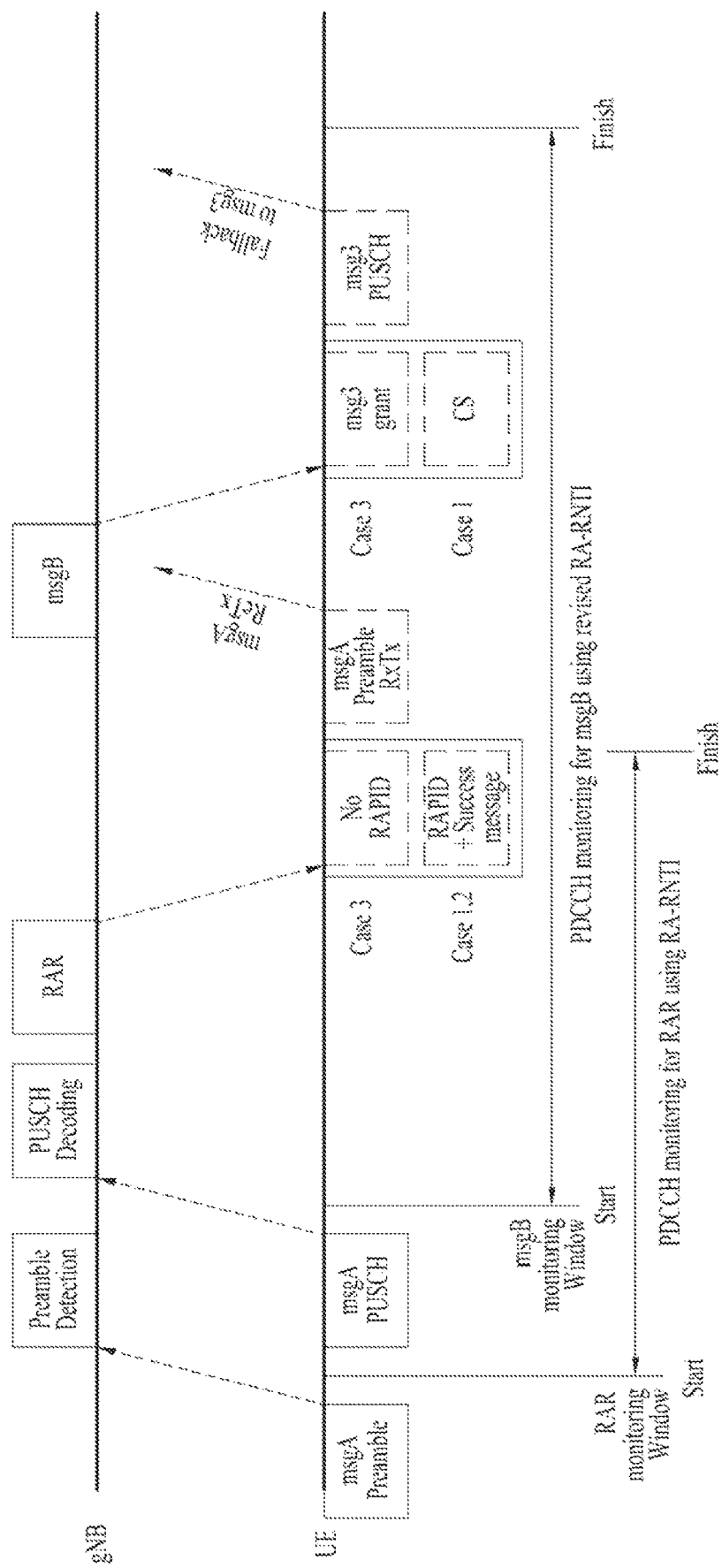

4) When RA-RNTIs for MsgB monitoring in the 2-step RACH procedure are generated according to related ROs, a MsgB monitoring window may overlap with another MsgB monitoring window related to an RO having an offset of 10 ms even if the size of the MsgB monitoring window is 10 ms because the starting point of the MsgB monitoring window is after a time at which a MsgA PUSCH is transmitted, as shown in FIG. 21. Accordingly, the RNTI generation method may be used to distinguish RNTIs related to overlapping MsgB monitoring windows. Meanwhile, the MsgA PUSCH may be transmitted after a MsgA PRACH preamble is transmitted. Accordingly, the time position of a PUSCH resource associated with the MsgA PRACH preamble may vary for each MsgA PRACH preamble.

In addition, Usage 3 may be applied to scenarios other than the above-described four scenarios.

2. Embodiment 2

Hereinafter, a method of distinguishing the 4-step RACH procedure and the 2-step RACH procedure based on a PDCCH while using an existing RA-RNTI and a method of identifying which PDCCH monitoring window is for the PDCCH when there are overlapping PDCCH monitoring windows will be described.

(1) Embodiment 2-1: Method of Using PDCCH Scrambling Sequence

An RNTI may consist of 16 bits, and a CRC scrambled to the 16 bits may consist of 24 bits. Accordingly, when the 16-bit RNTI is mapped, 8 bits remain. Among the 8 bits, at least one bit may be used to scramble the CRC. For example, in addition to a commonly used RNTI, bits capable of additionally specifying a corresponding PDCCH may be used for CRC scrambling.

By doing so, an RAR may be distinguished from MsgB of the 2-step RACH procedure. In addition, if the length of a monitoring window exceeds 10 ms, Embodiment 2-1 may be used to distinguish which monitoring window a PDCCH received in overlapping monitoring windows is related to.

(2) Embodiment 2-2: Method of Using DMRS Sequence

To generate a DMRS sequence, an RNTI and $N_{id}$ may be used as a seed value. In this case, a common RNTI is used as the seed value, and different $N_{id}$ values for specifying PDCCHs may be used to distinguish the corresponding PDCCHs.

(3) Embodiment 2-3: Method of Using PDCCH Contents

Some of the bits included in DCI may be used to indicate that PDCCHs are used for other purposes but use the same RA-RNTI. Here, the PDCCHs for other purposes may mean different PDCCHs for distinguishing an RAR and MsgB, different PDCCHs for distinguishing an RAR of the 2-step RACH procedure and an RAR of the 4-step RACH procedure, or different PDCCHs for distinguishing an RAR (or MsgB) received within a predetermined time (e.g., 10 ms) from the start of a monitoring window and an RAR (or MsgB) received after the predetermined time.

On the other hand, the corresponding indicator may be included in an RAR message or MsgB rather than the PDCCH contents.

3. Embodiment 3

Hereinafter, particular examples will be described with reference to Embodiments 1 and 2.

(1) Embodiment 3-1: Method of Distinguishing PDCCH for RAR of 2-Step RACH Procedure and PDCCH for RAR of 4-Step RACH Procedure An RO may be shared for the 2-step RACH procedure and the 4-step RACH procedure. In this case, different PRACH preambles may be allocated for each of the 2-step RACH procedure and the 4-step RACH procedure. However, if RA-RNTIs are generated based on ROs, it may be difficult for the UE that desires to receive different responses depending on to the RACH procedure to distinguish which RACH procedure a received response is related to.

In the 4-step RACH procedure, the UE may monitor a PDCCH for Msg2 from a slot after transmitting a PRACH preamble. Specifically, the UE may monitor the PDCCH based on an RA-RNTI within a monitoring window of up to 10 ms included in an RAR search space indicated by the BS for PDCCH monitoring.

On the other hand, in the 2-step RACH procedure, the UE may monitor a PDCCH for the RAR of the 2-step RACH procedure from a slot configured as DL or flexible after a lapse of a predetermined time from when the UE transmits a MsgA PRACH preamble and a MsgA PUSCH (for example, after PUSCH transmission or at the end of a PUSCH group).

In this case, the UE may monitor the PDCCH within a search space configured for the 2-step RAR. On the other hand, the search space configured for the 2-step RAR may be the same as a search space configured for the 4-step RACH procedure. Alternatively, the search space configured for the 2-step RAR may be separately designated for the 2-step RACH procedure.

When the UE monitors the PDCCH for the 2-step RAR, the UE may use different RNTIs based on the state of the UE. For example, when the UE is in the RRC CONNECTED state, the UE may use a C-RNTI to receive a success RAR, and at the same time, the UE may use an RA-RNTI to receive a fallback RAR. Alternatively, when the UE is in the RRC CONNECTED state, the UE may use only an RA-RNTI to receive the success RAR and fallback RAR.

On the other hand, when the UE is in the RRC IDLE/INACTIVE state, the UE may use an RA-RNTI to receive the 2-step RAR. For example, the 2-step RA-RNTI may be different from the 4-step RA-RNTI. As another example, the 4-step RA-RNTI and the 2-step RA-RNTI may be the same, and in this case, a specific bit string for the 2-step RACH procedure may be masked to N bits that remains after CRC mapping. For example, if a CRC is 24 bits and an RA-RNTI is 16 bits, 8 bits remain. Thus, the specific bit string is masked to the remaining 8 bits, and the 2-step RAR and the 4-step RAR may be distinguished based on the masked specific bit string.

Even if the PDCCH for the 2-step RAR and the PDCCH for the 4-step RAR are identified by the above method, there may be a collision between 2-step RA-RNTIs due to the following reasons. Monitoring of the PDCCH for the 2-step RAR starts at the time when a PUSCH occasion (PO) is transmitted after an RO, the monitoring duration may exceed 10 ms, and the existing RA-RNTI is repeated every 10 ms.

To solve this problem, information indicating which RO or PO the RA-RNTI is for may be indicated by a control signal (e.g., DCI) for the 2-step RACH RAR or an RAR message. For example, the lower N bits of an SFN may be included in the control signal or the RAR message. For example, N may have one of 1, 2, and 3, and the value of N may be determined according to the RAR monitoring window and the PDCCH search start time. In addition, information on a relative time elapsed from the RO may be included in the control signal or the RAR message. For example, information about N*10 ms from the RO may be included, and in this case, N may have a value of 1, 2, 3, 4, 5, 6, 7, or 8.

Embodiment 3-2: Method of Monitoring PDCCH for RAR when there is PRACH Preamble not Mapped to PUSCH Resource Unit (PRU) among 2-Step PRACH Preambles in Mapping of RO and PO In the 2-step RACH procedure, the UE may map PRACH preambles of a specific RO to PRUs of a specific PO to configure MsgA.

However, when the number of ROs is more than the number of POs, some ROs may not be mapped to the POs. Alternatively, some PRACH preambles may not be mapped to the PRUs. When the UE performs the 2-step RACH procedure, the UE may transmit MsgA by selecting a PRACH preamble that is not mapped to the PRUs at a specific time from among 2-step PRACH preambles. In this case, the time at which the UE monitors the PDCCH for the RAR of the 2-step RACH procedure may be after a PO on which PUSCH transmission is expected although no PUSCH is actually transmitted. However, if a PRACH preamble where PRACH preamble-to-PRU mapping is not performed or an RO related to the unmapped PRACH preamble is known to the BS and UE, PDCCH monitoring may be performed from a slot after the 2-step PRACH preamble is transmitted as in the existing 4-step RACH procedure where monitoring is performed from a slot after the PRACH preamble is transmitted. That is, the slot after transmitting the 2-step PRACH preamble may be the start time of monitoring the PDCCH for the 2-step RAR. In addition, in this case, since no PUSCH is actually transmitted, the BS may detect no PUSCH, and thus the UE may expect to receive the fallback RAR.

Figure 22:
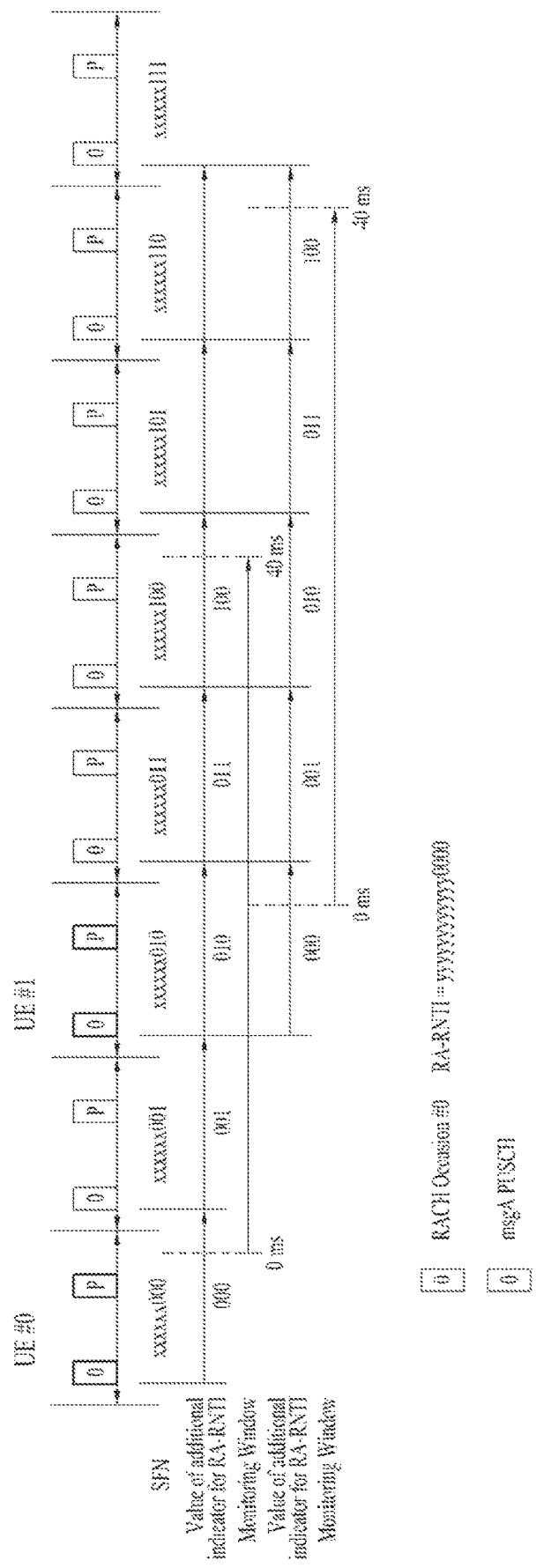

(3) Embodiment 3-3: Method of Including Time Information in DCI or RAR Message When PDCCH Monitoring Window Exceeds 10 ms Referring to FIG. 22, when a PDCCH is transmitted in a slot located within a range of 10 ms with respect to a RACH slot including an RO, time information included in DCI or an RAR message may be set to '000'. When the receiver (e.g., UE) obtains the time information of '000' in the DCI or RAR message, the receiver may recognize that the corresponding RAR is a response to a RACH transmitted from the RO located within the range of 10 ms. When the PDCCH is transmitted in a slot located within a range of 10 ms to 2*10 ms, the time information included in the DCI or RAR message may be set to '001'. The time information may be configured for other time ranges in a manner similar to the above. Meanwhile, the bit size of the time information is not limited. For example, if the time information consists of 3 bits as described above, a duration of 0 to X ms (40 ms$\leq$X$\leq$80 ms) may be divided into Y durations (4<Y$\leq$8) in units of 10 ms, and it is possible to identify which duration among 8 divided durations the PDCCH is transmitted in. In addition, if the time information consists of 5 bits, a duration of 0 to X ms (160 ms<X$\leq$320 ms) may be divided into Y durations (16<Y$\leq$32) in units of 10 ms, and it is possible to identify which duration among 32 divided durations the PDCCH is transmitted in.

When the PDCCH is transmitted in a slot located within a range of 10 ms with respect to a slot for monitoring a Msg2 RAR, the time information may be set to '000'. When the receiver (e.g., UE) obtains the time information of '000', the receiver may recognize that the corresponding Msg2 RAR is a response to a RACH transmitted from an RO located within the range of 10 ms. When the PDCCH is transmitted in a slot located within a range of 10 ms to 2*10 ms with respect to the slot for monitoring the Msg2 RAR, the time information may be set to '001'. The time information may be configured for other time ranges in a manner similar to the above. Meanwhile, the bit size of the time information is not limited. For example, if the time information consists of 3 bits as described above, a duration of 0 to X ms (40ms<X$\leq$80 ms) may be divided into Y durations (4<Y$\leq$8) in units of 10 ms, and it is possible to identify which duration among 8 divided durations the PDCCH is transmitted in. In addition, if the time information consists of 5 bits, a duration of 0 to X ms (160 ms<X$\leq$320 ms) may be divided into Y durations (16<Y$\leq$32) in units of 10 ms, and it is possible to identify which duration among 32 divided durations the PDCCH is transmitted in.

The time information may be configured similarly to the above-described method, but the reference slot may be a slot for monitoring a MsgB RAR.

The time information may be information indicating a relative difference between the number of a frame including the RO and the number of a frame at the time when the PDCCH is received.

(4) Embodiment 3-4: Method of Using CRC Scrambling to Distinguish DCI for MsgB and DCI for Msg2 When Both MsgB and Msg2 Use Same RNTI The following is extracted from Clause 7.3.2 CRC attachment of 3GPP TS 38.212.

Error detection for DCI transmission may be performed through a CRC. The entire payload for the CRC may be used to calculate CRC parity bits. The payload bits may be defined as $a_0, a_1, a_2, a_3, \ldots, a_{A-1}$, and parity bits may be defined as $p_0, p_1, p_2, p_3, \ldots, p_{L-1}$, where A is the payload size, and L is the number of parity bits. The parity bits are calculated based on an input bit sequence of $a'_0, a'_1, a'_2, a'_3, \ldots, a'_{A+L-1}$ and are according to Clause 5.1 of 3GPP TS 38.212. In this case, L may be 24 bits and appended based on a generation polynomial.

If K=A+L, output bits of $b_0, b_1, b_2, b_3, \ldots, b_{K-1}$ may be defined as:

$b_k = a_k$ when k=0, 1, 2, ..., A−1; and $b_k = p_{k-A}$ when k=A, A+1, A+2, ..., A+L−1.

After attachment, the CRC parity bits are scrambled in the form of a bit sequence of $c_0, c_1, c_2, c_3, \ldots, c_{K-1}$ based on the corresponding RNTI. In this case, the relationship between $c_k$ and $b_k$ is defined by $c_k = b_k$ when k=0, 1, 2, ..., A+7 and $c_k = (b_k + x_{mti,k-A-8}) \bmod 2$ when k=A+8, A+9, A+10, ..., A+23.

As described above, referring to the contents of Clause 7.3.2 of 3GPP TS 38.212, when the 16-bit RNTI is scrambled to the 24-bit CRC and additional scrambling is performed on the remaining bits, the CRC bits may be configured in the same way as in Equation 2 below.

$c_k = b_k$ for $k=0, \ldots, A-1$ $c_k = (b_k + x_{mask,k-A}) \bmod 2$ for $k = A, \ldots, A+7$ $c_k = (b_k + x_{mti,k-A-8}) \bmod 2$ for $k = A+8, \ldots, A+23$ [Equation 2]

Here, previously used {0,0,0,0,0,0,0,0} may be used as Xmask. If an additional mask is required, a bit string having at least one different bit such as {0,1,0,1,0,1,0,1}, {0,0,0,0,0,0,0,1}, etc. may be used.

Embodiment 3-4 may be applied even when the RNTI increases to 24 bits. In this case, for a conventional RNTI with 16 bits and an RNTI using extended bits (e.g., 24 bits), the number of scrambled bits may be determined based on the range of the above-described values.

4. Embodiment 4

In Embodiment 4, a time synchronization assumption between BSs including a gNB, a mobile BS, a satellite, a vehicle, etc. in a network supporting the 2-step RACH procedure will be described.

In particular, a time synchronization assumption used by the UE to perform handover will be described. That is, Embodiment 4 is not limited to a system including the UE and gNB, and Embodiment 4 may be applied to various types of BSs and UEs including repeaters such as an integration of access and backhaul (IAB) and a relay, and artificial satellites such as a non-terrestrial network (NTN). Embodiment 4 may also be applied to communication between various UEs such as communication between vehicles or communication between flying objects.

In the 2-step RACH procedure, the UE may transmit an MsgA PRACH preamble and an MsgA PUSCH. Upon receiving the MsgA PRACH preamble and MsgA PUSCH, the BS may attempt to detect the MsgA PRACH preamble and then attempt to acquire information on the UE from the MsgA PUSCH. If the BS successfully obtains the UE information based on the MsgA PRACH preamble detection and MsgA PUSCH decoding, the BS may transmit a success RAR to the UE. On the other hand, when the BS detects the MsgA PRACH preamble but fails to decode the MsgA PUSCH, the BS may transmit to the UE a fallback RAR to instruct the UE to fall back to the 4-step RACH procedure related to the successfully detected PRACH preamble.

If the BS fails in both the MsgA PRACH preamble detection and MsgA PUSCH decoding, the BS may not transmit any RAR to the UE.

To receive the success RAR or fallback RAR transmitted by the BS, the UE may monitor a PDCCH for MsgB based on a MsgB-RNTI. Upon detecting DCI related to the corresponding MsgB-RNTI, the UE may obtain a message for the success RAR or fallback RAR from a PDSCH scheduled by the DCI.

However, when the length of a monitoring window for the UE to monitor the PDCCH for MsgB based on the MsgB-RNTI is 10 ms or more, if different UEs select MsgA PRACH preambles on different ROs but use the same MsgB-RNTI, monitoring windows for PDCCH monitoring may overlap. In this case, there is a problem in that the UE is incapable of knowing exactly which RO is the detected PDCCH for the MsgA PRACH preamble is related to.

To solve this problem, a method of allowing UEs using the same MsgB-RNTI to distinguish an RAR related to detected DCI by transmitting information on the index of a frame where a corresponding RO is selected in the DCI may be introduced. Details of the method have been described in Embodiments 1 to 3.

In the LTE and NR systems, a frame index may be transmitted by the parameter called SFN, and the SFN is included in the PBCH. In other words, the SFN may be obtained by decoding the PBCH.

For example, when the UE selects a specific cell in the initial access stage, the UE may detects a physical cell ID (PCID) from a primary synchronization signal/secondary synchronization signal (PSS/SSS) and obtain various time information (e.g., SSB index, half frame index, etc.) including the SFN and information (e.g., RMSI CORESET, search space, SCS, resource block alignment, etc.) essential to receive system information block type 1 (SIB1) by decoding the PBCH.

When the UE obtains RACH-related information from SIB1, if the network indicates the 2-step RACH procedure, the UE may transmit MsgA and then use SFN information obtained from the PBCH decoding while monitoring MsgB.

When a primary cell of a master or secondary cell group (Spcell) is added to the UE in dual connectivity, the UE may receive the RACH configuration for a RACH performed through the Spcell from a Pcell. Then, the UE may perform a RACH procedure according to the corresponding RACH configuration. In addition, when handover is instructed, the UE may receive the RACH configuration of a target cell through a handover command Then, the UE may perform a RACH procedure for the target cell based on the corresponding RACH configuration.

If each of the RACH period and the RO to SSB association pattern period is 10 ms or more while the UE performs the dual connectivity or handover, the UE may need to know the SFN of the target cell to perform the RACH procedure. If the UE needs to complete the RACH procedure as well as time/frequency tracking within an interrupt time as in the handover, decoding of the PBCH of the target cell to obtain the SFN may be a significant burden on the UE. When the UE needs to complete the RACH procedure within the interrupt time as in the handover in the LTE and NR systems due to the above-mentioned problems, the UE may be allowed to perform the RACH procedure without PBCH decoding in order to reduce the time delay due to the PBCH decoding and reduce the burden on the UE caused by the PBCH decoding. That is, UE operations requiring the PBCH decoding may not be adopted.

Meanwhile, problems similar to the above may occur in the 2-step RACH procedure if the size of a MsgB monitoring window is 10 ms or more.

To solve these problems, the method of identifying multiple ROs using the same MsgB-RNTI by configuring a specific time for identifying UEs using the same MsgB-RNTI and transmitting to UEs information about a time duration from the specific time to a time when DCI is received has been proposed in Embodiment 3.

According to the method proposed in Embodiment 3, the UE needs to obtain SFN information from PBCH decoding. However, when the UE needs to complete a RACH procedure within an interrupt time as in handover as described above, a method of enabling the UE to obtain or assume an SFN related to a selected RO without PBCH decoding is required. Accordingly, methods of allowing the UE to assume or obtain the SFN without PBCH decoding are proposed.

(1) Embodiment 4-1:

1) If the 2-step RACH procedure is configured in the handover process, the UE may assume that synchronization between the current cell and the target cell is aligned.

2) If the 2-step RACH procedure is configured in the handover process and the MsgB monitoring window size exceeds 10 ms, the UE may assume that synchronization between the current cell and the target cell is aligned.

3) If at least one of the MsgB monitoring window for 2-step RACH contention free random access (CFRA) and the MsgB monitoring window for 2-step RACH contention based random access (CBRA) exceeds 10 ms in the handover process, the UE may assume that synchronization between the current cell and the target cell is aligned.

Hereinafter, the operation in which the UE assumes that synchronization between the current cell and the target cell is aligned in Embodiment 4-1 will be described in detail.

When the 2-step RACH procedure is configured during the handover to the target cell, the UE may assume that the absolute time difference between a radio frame i of the current cell and a radio frame i of the target cell is N. In this case, N may be, for example, 153600 Ts (5 ms) or 76800 Ts (2.5 ms), where Ts may be 1/2048/15000 s.

Specifically, when the target cell has Lmax=4 and uses a paired or unpaired spectrum, N=153600 Ts may be applied. In addition, when the target cell has Lmax=8 and uses an unpaired spectrum and when the source cell uses a paired or unpaired spectrum, N=76800 Ts may be applied.

In other words, it may be assumed for frequency division duplex (FDD) in a band below 3 GHz in FR1 that the indices of frames of the target cell are equal to those of the current cell within a time error range of +/−5 ms. In addition, it may be assumed for time division duplex (TDD) in a band below 2.8 GHz that the indices of frames of the target cell are equal to those of the current cell within a time error range of +/−5 ms. Further, for TDD in a band above 2.8 GHz in FR1, it may be assumed that the indices of frames of the target cell are equal to those of the current cell within a time error range of +/−2.5 ms.

(2) Embodiment 4-2

If the MsgB monitoring window size for the 2-step RACH CFRA is less than 10 ms and the MsgB monitoring window size for the 2-step RACH CBRA is more than 10 ms, the UE may perform the 2-step RACH CFRA based on a handover command. Alternatively, the UE may perform CBRA by selecting the 4-step RACH CBRA instead of the 2-step RACH CBRA.

(3) Embodiment 4-3

When the UE performs handover, the network may inform the UE whether the network is synchronous or asynchronous through a synchronization assumption indicator. If the corresponding indicator indicates that the network is synchronous and the 2-step RACH procedure is configured, the UE may perform the 2-step RACH procedure. On the other hand, if the corresponding indicator indicates that the network is asynchronous, the UE may perform the 4-step RACH procedure rather than the 2-step RACH procedure. However, even in this case, the UE may perform the 2-step RACH procedure if the UE completes the handover and acquires the SFN. In some cases, the UE may perform the 4-step RACH procedure.

(4) Embodiment 4-4

The network may provide information on the SFN of the target cell to the UE through a handover command. For example, the network may provide a relative difference between the SFN of the current cell and the SFN of the target cell to the UE through the handover command 5. Embodiment 5

If the BS successfully decode a MsgA PUSCH, the BS may transmit a success RAR to the UE based on a C-RNTI. The UE does not need to obtain an SFN because the UE receives DCI based on C-RNTI. In addition, in this case, the length of a monitoring window may increase relatively However, if the BS fails to decode the MsgA PUSCH, the BS may transmit a fallback RAR based on a MsgB-RNTI. In this case, if the UE receives DCI based on the MsgB-RNTI, the UE needs to obtain information on the SFN of the target cell to decode SFN related information included in the DCI.

For example, when the UE receives the DCI based on the MsgB-RNTI, the UE may compare the SFN related information included in the DCI with an SFN in which the UE transmits a MsgA PRACH preamble. If it is determined that the SFN included in the DCI matches or corresponds to the SFN in which the MsgA PRACH preamble is transmitted, the UE may perform a subsequent RACH procedure.

Here, the subsequent RACH procedure may mean that when the BS successfully decodes a PUSCH and transmits a success RAR, the UE transmits a PUCCH including HARQ-ACK information having an ACK value indicating that the UE has successfully received MsgB. In addition, the subsequent RACH procedure may also mean that when the BS transmits a fallback RAR due to failure in PUSCH decoding, the UE performs a process to fall back to the 4-step RACH procedure.

However, as described in Embodiment 4, when the UE performs handover, it may be difficult for the UE to obtain the SFN of the target cell if the UE performs the RACH procedure without decoding the PBCH of the target cell.

In Embodiment 5, operation methods of allowing the UE to terminate the RACH procedure when the UE fails to acquire the SFN of the target cell will be described. For example, if the UE does not decode the PBCH during the handover process in order to reduce the time delay and processing load of the UE due to the PBCH decoding, the UE may perform the RACH procedure in a state in which the UE does not know information about the SFN in which the MsgA PRACH preamble is transmitted.

In other words, how the UE operates when the UE fails to obtain the SFN of the target cell will be described in Embodiment 5.

When the UE does not acquire the SFN of the target cell, the UE may transmit MsgA. In addition, when monitoring MsgB, the UE may assume a monitoring window shorter than a monitoring window configured by the network. In addition, when the UE receives DCI based on a MsgB-RNTI, the UE may decode a PDSCH scheduled by the corresponding DCI without checking the validity of an SFN indicator (e.g., SFN related information) included in the DCI.

Here, the operation in which the UE does not check the validity of the SFN related information included in the DCI may mean that the UE does not check whether or not the SFN in which the MsgA PRACH preamble is transmitted matches and/or corresponds to the SFN related information included in the DCI. Further, the operation may mean that the UE decodes the PDSCH scheduled by the DCI and checks an RAR without checking whether the SFN in which the MsgA PRACH preamble is transmitted matches and/or corresponds to the SFN related information included in the DCI.

Hereinafter, particular methods by which the UE decodes the PDSCH without checking the validity of the SFN related information included in the DCI will be described.

(1) Embodiment 5-1

When the UE monitors DCI based on a C-RNTI, the UE may use the value of a monitoring window (e.g., window length) configured for the C-RNTI as it is.

On the other hand, when the UE monitors DCI based on a MsgB-RNTI, the length of a monitoring window may be limited to 10 ms. When receiving the DCI based on the MsgB-RNTI, the UE may perform PDSCH decoding regardless of SFN related information included in the DCI.

When the UE does not receive a success RAR within the monitoring window based on the C-RNTI, the UE may retransmit MsgA or transmit Msg1 to fall back to the 4-step RACH procedure.

When the UE receives a fallback RAR based on the MsgB-RNTI, if the BS transmits the fallback RAR within the 10 ms range of the monitoring window, there may be no problem due to contention by the fallback RAR. In addition, in this case, there may be no problem in the PBCH decoding of the UE.

(2) Embodiment 5-2

The UE may use the length of a monitoring window configured based on a MsgB-RNTI as it is. In this case, the monitoring window may be an MsgB monitoring window and/or an RA monitoring window. For example, if the length of the monitoring window based on the MsgB-RNTI exceeds 10 ms, the UE may monitor DCI related to the MsgB-RNTI by assuming a monitoring window longer than 10 ms. In this case, the UE may ignore SFN related information included in the received DCI. That is, the UE may decode a PDSCH on a PDSCH resource indicated by the DCI, regardless of a value of the SFN related information.

Here, the operation in which the UE ignores the SFN related information may mean that the UE does not decode bits related to the SFN included in the DCI or that even if the UE decodes the bit related to the SFN included in the DCI to obtain information on the SFN, the UE discards the decoded bits.

For example, if the UE transmits MsgA to the target cell during the handover process but fails to acquire information on the SFN in which the MsgA PRACH preamble is transmitted and detects the DCI based on the MsgB-RNTI, the UE may decode the PDSCH on the PDSCH resource indicated by the DCI regardless of the SFN related information included in the DCI.

For example, if the UE does not decode the PBCH during the handover process in order to reduce the time delay and processing load of the UE due to the PBCH decoding, the UE may transmit MsgA to the target cell without knowing the SFN in which the MsgA PRACH preamble is transmitted. In this case, the UE may decode the PDSCH on the PDSCH resource indicated by the DCI regardless of the SFN related information included in the DCI.

In addition, when the RAR obtained from the PDSCH decoding is a success RAR, the UE transmits HARQ-ACK information having an ACK value to the BS over a PUCCH. When the acquired RAR is a fallback RAR, the UE may perform the 4-step RACH procedure.

(3) Embodiment 5-3

To perform handover to the target cell in the asynchronous network, the UE may monitor DCI within a monitoring window (e.g., a monitoring window of 40 ms) after transmitting MsgA. When the UE receives DCI for MsgB where an RAPID and RNTI related parameters except for SFN related two bits are matched within the corresponding monitoring window, the UE may proceed with a subsequent procedure until contention resolution succeeds or fails without validation of the SFN related two bits for receiving MsgB.

However, if the UE is capable of confirming that the SFN related two bits included in the DCI for MsgB do not match the least significant two bits of the SFN of a frame in which the UE transmits MsgA, the UE may not proceed with the subsequent RACH procedure by determining that the MsgB is not valid.

In other words, according to Embodiment 5-3, if the UE detects DCI for MsgB based on a MsgB-RNTI, the UE may decode a PDSCH on a PDSCH resource indicated by the DCI regardless of SFN related information included in the DCI (or by ignoring the SFN related information) as described in Embodiment 5-2.

However, if the UE knows an SFN in which MsgA is transmitted for some reason and if the UE obtains and decodes the SFN related information included in the DCI, the UE may compare the SFN in which MsgA is transmitted and the SFN related information included in the DCI. If the UE knows that the SFN in which MsgA is transmitted does not match or does not correspond to the SFN related information included in the DCI, the UE may determine that the PDSCH received on the PDSCH resource indicated by the DCI is not valid and thus transmit a PRACH for the 4-step RACH procedure or retransmit MsgA for the 2-step RACH procedure.

That is, if the UE decodes a PBCH of the target cell for some reason or recognizes the SFN in which MsgA is transmitted to the target cell without performing PBCH decoding, the UE may be capable of performing the RACH procedure accurately by checking the validity of the SFN related information included in the DCI. This is because in this case, the UE may neither need to ignore the SFN related information included in the DCI nor perform the validity check process.

(4) Embodiment 5-4

When the length of an RAR monitoring window is set more than 10 ms, if the UE is handed over from an asynchronous network to a target cell, the UE may assume that the length of the corresponding monitoring window is up to 10 ms.

(5) Embodiment 5-5

A handover (HO) interrupt time may be redefined for the 2-step RACH procedure. For example, the HO interrupt time for the 2-step RACH procedure may be set less than or equal to the existing interrupt time.

(6) Embodiment 5-6

If the UE performs PBCH decoding more than once within a HO interrupt time, the UE may perform the RACH procedure. The network may determine whether the PBCH decoding is possible more than once within the HO interrupt time and inform the UE of the determination by transmitting a parameter including a predetermined threshold value to the UE. If the predetermined threshold in the corresponding parameter satisfies a specific measurement, the UE may determine that the UE is capable of performing the PBCH decoding more than once within the HO interrupt time and then perform the PBCH decoding.

(7) Embodiment 5-7

When the UE is capable of low latency PBCH decoding in an asynchronous network, if a signal-to-noise (SNR) range capable of detecting a PBCH at one time (i.e., single-shot PBCH) is configured or if the corresponding SNR range is satisfied, the UE may perform PBCH decoding.

For example, the UE may perform the 2-step RACH procedure only if the PBCH detection success rate exceeds a predetermined level (e.g., 99.9%) after several attempts (e.g., one attempt).

However, for a synchronous network, the UE may perform the 2-step RACH procedure without any conditions. If a network gives a RACH of 20 ms or longer, the network is assumed to be synchronous. Therefore, RAN4 needs to include a condition that the RACH succeeds only in 20 ms. For example, second HO minimum performance may be included. That is, UEs satisfying this new condition or UEs capable of obtaining necessary information before HO by decoding PBCHs of neighboring cells may perform the 2-step RACH procedure.

Details of the above-described UE capability, HO condition, new condition, monitoring window, SFN related information, etc. are applicable to wireless communication systems operating in unlicensed bands, and in particular, the details may be applied to the 4-step RACH procedure and the 2-step RACH procedure.

Each of the sub-embodiments of Embodiment 5 may be implemented independently, but the sub-embodiments may be combined. In addition, the sub-embodiments described in Embodiments 1 to 4 or 6 to 9 may be implemented in combination with the sub-embodiments of Embodiment 5 as well.

6. Embodiment 6

In CFRA for 2-step RACH procedure, the UE may transmit MsgA. Upon receiving MsgA, the BS may detect a PRACH preamble and decodes a PUSCH related to the detected PRACH preamble. If the BS successfully detects the PUSCH, the BS may transmit a response thereto to the UE. In this case, a CRC may be masked with a C-RNTI for DCI. The UE may detect the DCI based on the C-RNTI and acquire information transmitted by the BS over a PDSCH.

Hereinafter, a method of configuring MsgA for the CFRA of the 2-step RACH procedure will be described.

In the CFRA, the UE may be allowed to transmit only a MsgA PRACH preamble without mapping to a PUSCH resource. Therefore, MsgA may consist of only a PRACH preamble.

When the UE selects the 2-stepRACH, if the channel quality (e.g., RSRP) of a SSB/CSI-RS is higher than a specific value, the UE may perform 2-step RACH CFRA where the UE transmits only the PRACH preamble. If the channel quality becomes less than or equal to the specific value, the UE may perform 2-step RACH CBRA where the UE transmits both the PRACH preamble and the PUSCH.

Specifically, in the conventional 4-step RACH procedure, CFRA may be performed in two stages. When the CFRA is performed in two stages, the UE may start monitoring of an RAR after transmitting a PRACH preamble and then receive the RAR as a response to the PRACH preamble.

However, in the 2-step RACH procedure, if MsgA includes a MsgA PUSCH as well as the MsgA PRACH preamble, the UE may perform RA monitoring after transmitting the MsgA PUSCH. Therefore, if the 2-step RACH CFRA is configured with the MsgA PRACH preamble and the MsgA PUSCH, the 2-step RACH CFRA may require not only a time for MsgA transmission but also a time for the BS to receive and process MsgA and a time for UE to monitor random access. As a result, the total time required for the RACH procedure may increase. However, it may be undesirable that the total time required for the RACH procedure increases when an interrupt time needs to be considered as in HO.

If transmission of information necessary for a PUSCH during the RACH procedure gives a greater benefit even though the RACH time increases, it may be considered to transmit the PRACH preamble and PUSCH. Otherwise, it is undesirable that the RACH time increases.

If PUSCH related information is not indicated by parameters configured for the CFRA, MsgA may consist of only the PRACH preamble in the CFRA. If the PUSCH related information is indicated, MsgA may consist of the MsgA PRACH preamble and the MsgA PUSCH, and MsgA may be transmitted by the UE to the BS.

The BS may configure a plurality of POs to the UE. In this case, the plurality of POs may have a one-to-one relationship with PRACH preambles for RO(s). When there is a mask index and an SSB/CSI-RS index for indicating an RO, an SSB/CSI-RS index applied to a RACH may be applied to a PO. A RACH slot may be mapped to POs included in a PUSCH slot having a predetermined time duration.

If the number of ROs indicated by RACH mask indices is greater than the number of POs, only the PRACH preamble may be transmitted on specific ROs, and both the MsgA PRACH and MsgA PUSCH may be transmitted on the remaining ROs. In this case, the specific ROs may be ROs not mapped to the POs, and the remaining ROs may be ROs mapped to the PO.

If the number of ROs is less than the number of POs, only some of the POs may be used for MsgA transmission, and the rest may not be used. In this case, the POs used for MsgA transmission may be POs mapped to the RO.

7. Embodiment 7

In Embodiment 7, a method of configuring a monitoring window for MsgA including only a PRACH preamble will be described. In particular, Embodiment 7 may be applied to CBRA.

The UE may transmit only the PRACH preamble on a valid PRACH occasion in the following two cases:
When the PO related to a DMRS resource is not mapped to the PRACH preamble in a valid PRACH occasion; and
When the PRACH occasion is mapped to a valid PO but PUSCH transmission is dropped due to LBT failure in a shared spectrum.

(1) Embodiment 7-1: When PO is Not Mapped to PRACH Preamble in Valid PRACH Occasion MsgA may be configured by combining a MsgA PRACH preamble and a MsgA PUSCH. However, if the number M of available PRACH preambles included in a specific time duration is not the same as the number N of PUSCH resources (or DMRS resources), some of the PRACH preambles may not be mapped to the PUSCH resources. For example, if M=K*N is satisfied, M/K PRACH preambles may be mapped to one PUSCH resource. Accordingly, all PRACH preambles may be mapped to the PUSCH resources.

On the other hand, if M>K*N is satisfied, K=ceiling (M/L) PRACH preambles may be mapped to one PUSCH resource. Accordingly, some PRACH preambles may be mapped to all N PUSCH resources, but M−K*N PRACH preambles remain. In this case, it may be considered that MsgA is consist of only the remaining PRACH preambles.

After transmission of MsgA, it is necessary to determine the starting point of a monitoring window for MsgB.

When MsgA consists of the PRACH preamble and PUSCH, the MsgB monitoring window may be configured with respect to a PO for transmission of the MsgA PUSCH related to the MsgA PRACH preamble. However, when MsgA consists of only the PRACH preamble, there may be no MsgA PUSCH mapped to the PRACH preamble, so that it may be difficult to configure the MsgB monitoring window with respect to the PO.

To solve this problem, the following two methods may be considered.

Method 1) The MsgB monitoring window may be configured with respect to a PO related to transmission of a specific PUSCH although the PUSCH has no mapping relationship with the PRACH preamble.

For example, the MsgB monitoring window may be configured with respect to a PO of a PUSCH resource mapped to a specific PRACH preamble in an RO including the MsgA PRACH preamble.

In other words, the MsgB monitoring window may start at the first symbol of the earliest CORESET after the last symbol of a PO related to PUSCH transmission corresponding to the PRACH preamble in a valid PRACH occasion.

As another example, the MsgB monitoring window may be configured with respect to a specific PO (e.g., the first or last PO among valid POs) among POs included in a PUSCH slot designated based on a RACH slot including the MsgA PRACH preamble.

Method 2) The MsgB monitoring window may be configured with respect to an RO related to PRACH preamble transmission.

In other words, the MsgB monitoring window may start at the first symbol of the earliest CORESET after the last symbol of a PRACH occasion related to PRACH transmission.

(2) Embodiment 7-2: When PUSCH Transmission is Dropped Due to LBT Failure

The MsgB monitoring window may be configured with respect to a PO in which PUSCH transmission related the PRACH preamble is attempted.

In other words, the MsgB monitoring window may start at the first symbol of the earliest CORESET after the last symbol of a PO on which PUSCH transmission is attempted.

8. Embodiment 8

In Embodiment 8, a case in which the network detects a PRACH preamble without decoding a PUSCH will be described. In this case, the network operation may be considered to be equivalent to reception of Msg1, so that the network may provide the UE with the necessary information in an RAR. If the UE supports the 2-step RACH procedure, the UE may continuously attempt to decode a PDCCH for MsgB until detecting MsgB. Provision of information in the RAR may not be burdensome for the UE. That is, considering the relationship with MsgB, the RAR may be reused for PUSCH decoding failure or fallback mechanisms.

(1) Embodiment 8-1: Indication of PRACH Preamble Detection Success and PUSCH Decoding Failure in RAR Upon receiving MsgA (PRACH preamble+PUSCH) transmitted by the UE in the 2-step RACH procedure, the BS may perform PRACH preamble detection and PUSCH decoding. When the BS successfully detects the PRACH preamble, the BS may decode the PUSCH related to the PRACH preamble.

In addition, when the BS determines through a CRC check that the BS successfully receives information bits or when the BS fails to restore the information bits, the BS may transmit information about the PRACH preamble, which the BS has successfully detected, to the UE in an RAR. The BS may transmit the RAPID of the detected PRACH preamble to the UE.

When the BS fails to decode the PUSCH, the BS may transmit a UL grant related to the corresponding RAPID, a timing advanced (TA) command, TC-RNTI, and the like. On the other hand, when the BS successfully decodes the PUSCH, the BS may inform the UE of the success or failure of the PUSCH decoding by using some bits and/or some code points included in the RAR message. For example, the BS may inform the UE of the success or failure of the PUSCH decoding by using some states among various states indicated by bits of the UL grant.

The UE may monitor a PDCCH based on an RA-RNTI and receive the RAR message based on the PDCCH. In addition, the UE may check the RAPID of the PRACH preamble transmitted by the UE from the RAR message and also check whether the RAPID is successfully detected and whether the PUSCH decoding is successful. If the UE confirms that the RAPID detection is successful and that the PUSCH decoding is successful, the UE may obtain the TA command and TC-RNTI and use them to monitor a MsgB PDCCH to be transmitted later. The obtained TA command may be used for UL transmission.

On the other hand, if the UE confirms that the RAPID detection is successful but the PUSCH decoding fails, the UE may obtain the TA command, TC-RNTI and/or UL grant, etc., and then transmit Msg3.

If the UE confirms that the PRACH preamble detection is not successful, the UE may retransmit MsgA of the 2-step RACH procedure or transmit Msg1 (i.e., PRACH preamble) by falling back to the 4-step RACH procedure.

If the UE does not receive the RAR within an RAR monitoring window, the UE may retransmit MsgA of the 2-step RACH procedure after the RAR monitoring window ends. Alternatively, the UE may fall back to the 4-step RACH procedure and transmit Msg1 (i.e., PRACH preamble).

(2) Embodiment 8-2: Indication of PRACH Preamble Detection Success in RAR and Indication of Fallback to Msg3 of 4-step RACH Procedure in MsgB In the 2-step RACH procedure, the UE may transmit an MsgA PRACH preamble and an MsgA PUSCH. After transmitting the MsgA PRACH preamble, the UE may receive a PDCCH for an RAR in an RAR monitoring window. In addition, after transmitting the MsgA PUSCH, the UE may receive a PDCCH for MsgB in a monitoring window for MsgB.

In this case, the starting point of the RAR monitoring window may be earlier than the monitoring window for MsgB. Also, the length of the RAR monitoring window may be different from the length of the monitoring window for MsgB. Meanwhile, the RAR monitoring window and the monitoring window for MsgB may partially overlap.

Upon receiving the MsgA PRACH preamble and the MsgA PUSCH transmitted by the UE, the BS may perform PRACH preamble detection and PUSCH decoding. If the BS successfully detects the PRACH preamble, the BS may inform the UE whether or not the PRACH preamble is successfully detected in the RAR. The RAR contents may include an RAPID, a TA, a UL grant, and/or a TC-RNTI. In the 2-step RACH procedure, an indicator indicating whether PRACH preamble detection is successful may be transmitted together with the RAPID.

For example, the BS may transmit information on the success or failure of the PRACH preamble detection to the UE by using some bits or some code points of the RAR message. Specifically, the BS may transmit the information on the success or failure of the PRACH preamble detection to the UE by using some states among various states indicated by bits of the UL grant. In addition, the BS may also transmit the TA and/or TC-RNTI to the UE. If the BS transmits the TA, TC-RNTI, etc. in MsgB rather than the RAR, bits for the TA and TC-RNTI may be reserved or used for other purposes.

When the UE obtains the RAR based on RAR monitoring, the UE may check the RAPID. If the UE confirms that the PRACH preamble detection has been successful, the UE may continue monitoring the PDCCH for MsgB until the monitoring window for MsgB ends even after the RAR monitoring window ends.

If the UE does not receive a message related to the RAPID within the RAR monitoring window, the UE may retransmit MsgA or fall back to the 4-step RACH procedure to perform the RACH again. Alternatively, the UE may attempt to access a new cell by discovering another cell ID.

When the BS receives the MsgA PUSCH transmitted by the UE and successfully detects the PUSCH, the BS may transmit a message for performing a contention resolution procedure to the UE in MsgB.

If the BS fails to decode the PUSCH, the BS may transmit a UL grant for Msg3 transmission to the UE in MsgB. If the TA, TC-RNTI, etc. are transmitted to the UE in the RAR message, the TA, TC-RNTI, etc. may not be transmitted in MsgB. On the contrary, if the TA, TC-RNTI, etc. are not transmitted in the RAR message, the TA, TC-RNTI, etc. may be transmitted to the UE in MsgB. For example, if MsgB is transmitted before the RAR, if only MsgB is transmitted, or if the TA, TC-RNTI, etc. are not included in the 2-step RACH RAR, the TA, TC-RNTI, etc. may be transmitted to the UE in MsgB.

Upon confirming the detection of the PRACH preamble from the RAR, the UE may continuously perform monitoring of MsgB. Upon receiving MsgB, the UE may perform the contention resolution procedure or may transmit Msg3 to the BS.

9. Embodiment 9

If the UE does not receive MsgB within a monitoring window for MsgB, the UE may retransmit MsgA. The above procedure is similar to retransmission of Msg1 when the UE is incapable of receiving an RAR in LTE.

In this case, how to configure the monitoring window for MsgB and a timer therefor needs to be discussed. According to Embodiment 9, since a PRACH preamble and a PUSCH are transmitted in MsgA, the starting point of the monitoring window for MsgB may be later than the starting point of an RAR monitoring window as shown in FIG. 21.

It is obvious that each of the examples of the proposed methods may also be included as one implementation method of the present disclosure, and thus each example may be regarded as a kind of proposed method. Although the above-described embodiments may be implemented independently, some of the embodiments may be combined and implemented. In addition, it may be regulated that information on whether the embodiments are applied or information on rules related to the embodiments is transmitted from the BS to the UE in a predefined signal such as physical layer signaling or higher layer signaling.

The various details, functions, procedures, proposals, methods, and/or operational flowcharts described above in this document may be applied to a variety of fields that require wireless communication/connection (e.g., 5G) between devices.

Hereinafter, a description will be given in detail with reference to drawings. In the following drawings/descriptions, the same reference numerals may denote the same or corresponding hardware blocks, software blocks, or functional blocks unless specified otherwise.

Figure 23:
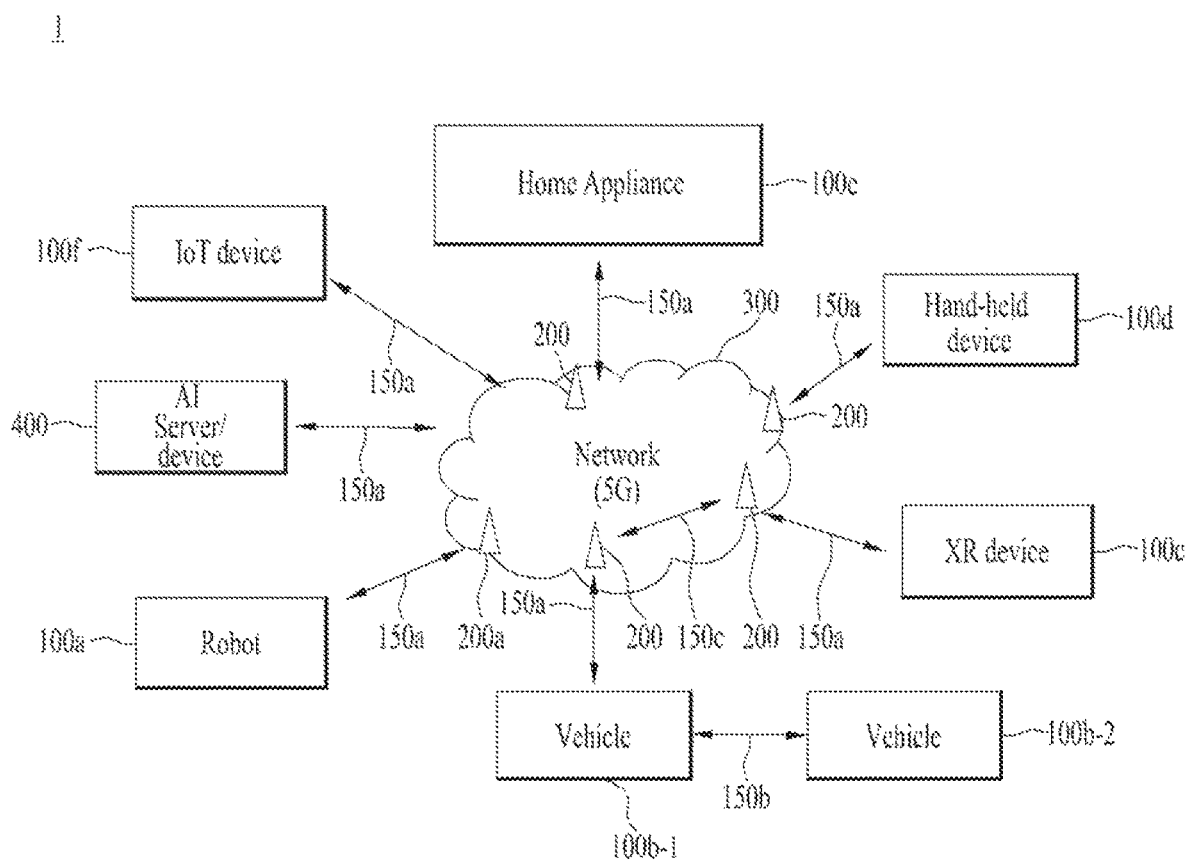
FIG. 23 illustrates an example of a communication system to which embodiments of the present disclosure are applied.

FIG. 23 illustrates a communication system 1 applied to the present disclosure.

Referring to FIG. 23, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 24:
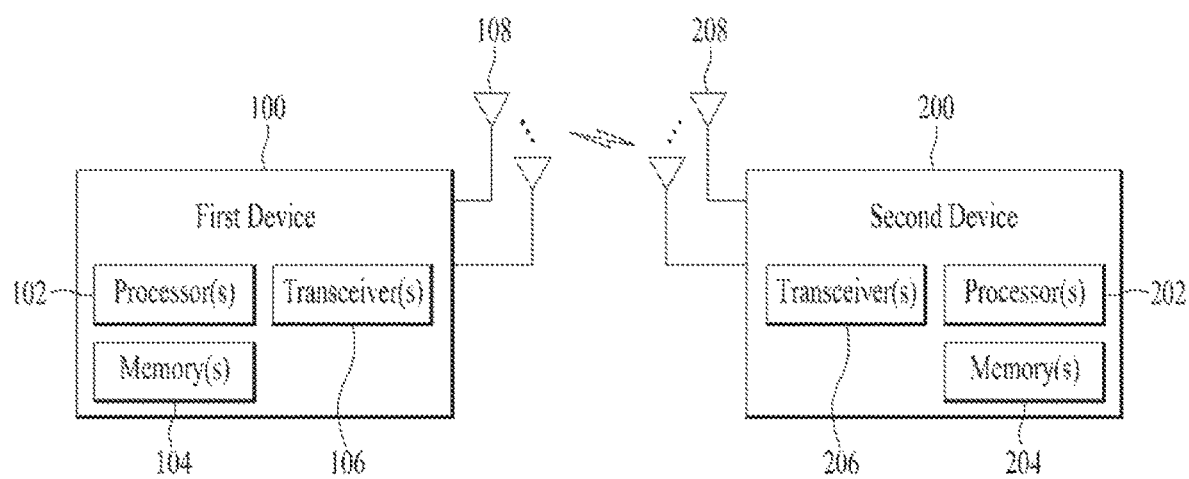
FIGS. 24 to 27 illustrate examples of various wireless devices to which embodiments of the present disclosure are applied.

FIG. 24 illustrates wireless devices applicable to the present disclosure.

Referring to FIG. 24, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 23.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

Hereinafter, a description will be given of instructions and/or operations controlled by the processor(s) 102 and stored in the memory(s) 104 of the first wireless device 100 according to an embodiment of the present disclosure.

While the following operations are described in the context of control operations of the processor(s) 102 from the perspective of the processor(s) 102, software code for performing the operations may be stored in the memory(s) 104.

Specifically, the processor(s) 102 may control to transmit MsgA to the BS. In this case, MsgA may include only a PRACH or may include a PUSCH as well as the PRACH. When MsgA includes both the PRACH and PUSCH, the processor(s) 102 may transmit the PUSCH after transmitting the PRACH.

In this case, the processor(s) 102 may transmit the PRACH while knowing an SFN for transmitting the PRACH or may transmit the PRACH without knowing the SFN for transmitting the PRACH. Details thereof may be found in the above-described embodiments.

The processor(s) 102 may control to monitor and receive DCI scheduling MsgB. The processor(s) 102 may descramble a CRC from the DCI based on a MsgB-RNTI. Upon confirming the CRC, the processor(s) 102 may decode information bits included in the DCI.

The processor(s) 102 may decode lower two bits for the index of an SFN in the DCI and then compare the lower two bits with lower two bits for the index of the SFN for transmitting the PRACH.

However, if the processor(s) 102 controls to transmit the PRACH without knowing the SFN for transmitting the PRACH, the processor(s) 102 may not compare the lower two bits for the SFN included in the DCI and the lower two bits for the SFN for transmitting the PRACH.

Details thereof may be found in the above-described embodiments.

The processor(s) 102 may control to receive a PDSCH for an RAR based on the DCI. In this case, the processor(s) 102 may receive the PDSCH according to the result of comparing the lower two bits for the SFN included in the DCI and the lower two bits for the SFN for transmitting the PRACH. On the other hand, the processor(s) 102 may control to receive the PDSCH regardless of the result of comparing the lower two bits for the SFN included in the DCI and the lower two bits for the SFN for transmitting the PRACH.

In addition, the processor(s) 102 may control to receive the PDSCH or perform other operations instead of receiving the PDSCH, depending on whether the processor(s) 102 is capable of comparing the lower two bits for the SFN included in DCI and the lower two bits for the SFN for transmitting the PRACH and/or according to the comparison result.

The operations of the processor(s) 102 depending on whether the processor(s) 102 is capable of comparing the lower two bits for the SFN included in the DCI and the lower two bits for the SFN for transmitting the PRACH and/or according to the comparison result may be based on the above-described embodiments.

The processor(s) 102 may control to transmit a UL signal based on the PDSCH. In this case, the UL signal transmitted by the processor(s) 102 may vary depending on the RAR of the PDSCH and depending on whether the PDSCH is received. For example, if the RAR is a fallback RAR, the processor(s) 102 may control to transmit the PRACH for the Type-1 RACH procedure. As another example, if the RAR is a success RAR, the processor(s) 102 may control to transmit a PUCCH by including HARQ-ACK information corresponding to an ACK in the PUCCH.

If the processor(s) 102 does not receive the PDSCH, the processor(s) 102 may control to transmit the PRACH according to the Type-1 RACH procedure or transmit (or retransmit) the PRACH and PUSCH according to the Type-2 RACH procedure.

The operations of the processor(s) 102 may be based on one or more of the above-described embodiments. That is, the operations of the processor(s) 102 may be performed based on any one of the above-described embodiments or any combination of two or more of the above-described embodiments.

Hereinafter, a description will be given of instructions and/or operations controlled by processor(s) 202 and stored in memory(s) 204 of the second wireless device 200 according to an embodiment of the present disclosure.

While the following operations are described in the context of control operations of the processor(s) 202 from the perspective of the processor(s) 202, software code for performing the operations may be stored in the memory(s) 204.

The processor(s) 202 may control to receive MsgA from the UE. In this case, MsgA may include only a PRACH or may include a PUSCH as well as the PRACH. When MsgA includes both the PRACH and PUSCH, the processor(s) 202 may control to receive the PUSCH after receiving the PRACH.

The processor(s) 202 may control to decode MsgA and transmit DCI having a CRC scrambled by a MsgB-RNTI to the UE based on the decoding result.

The processor(s) 202 may control to transmit a PDSCH for an RAR based on the DCI. If the processor(s) 202 detects both the PRACH and PUSCH, the RAR may be a success RAR. If the processor(s) 202 detects only the PRACH and does not detect the PUSCH, the RAR may be a fallback RAR. If the processor(s) 202 does not detect both the PRACH and PUSCH, the processor(s) 202 may control to not transmit the DCI and PDSCH.

If the processor(s) 202 transmits the PDSCH, the processor(s) 202 may control to receive a UL signal based on the PDSCH. In this case, the UL signal may vary depending on the RAR of the PDSCH and depending on whether the UE receives the PDSCH. For example, if the RAR is the fallback RAR, the processor(s) 202 may control to receive the PRACH for the Type-1 RACH procedure. As another example, if the RAR is the success RAR, the processor(s) 202 may control to receive a PUCCH including HARQ-ACK information corresponding to an ACK.

If the UE does not receive the PDSCH, the processor(s) 202 may control to receive the PRACH according to the Type-1 RACH procedure or receive (or receive again) the PRACH and PUSCH according to the Type-2 RACH procedure.

The above-described operations of the processor(s) 202 may be based on one or more of the above-described embodiments. That is, the operations of the processor(s) 202 may be performed based on any one of the above-described embodiments or any combination of two or more of the above-described embodiments.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 25:
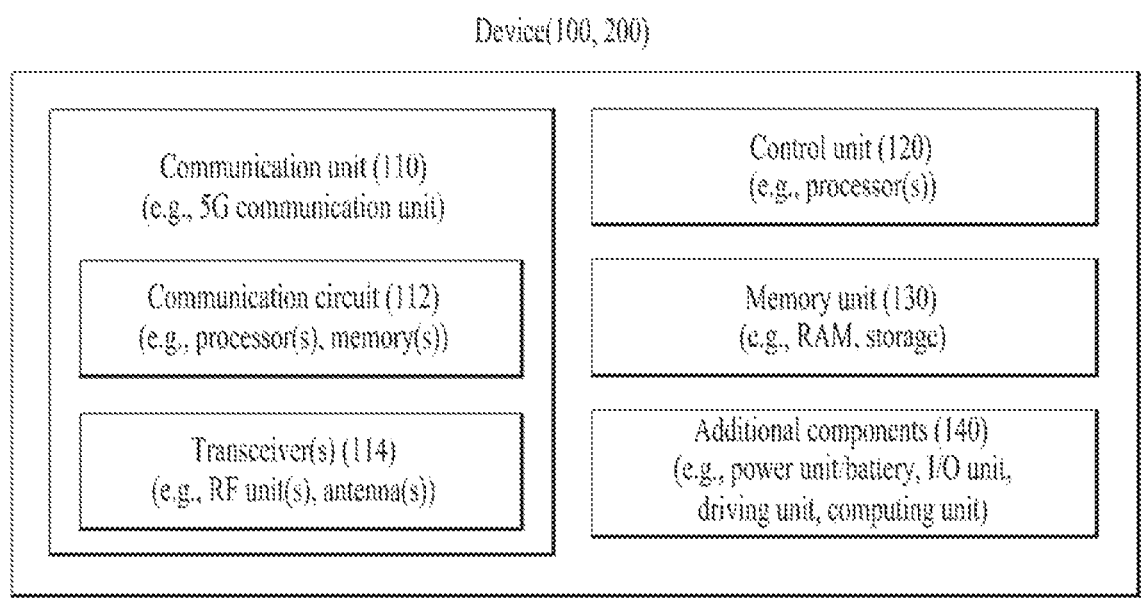

FIG. 25 illustrates another example of a wireless device applied to the present disclosure. The wireless device may be implemented in various forms according to a use case/service (refer to FIG. 23).

Referring to FIG. 25, wireless devices 100 and 200 may correspond to the wireless devices 100 and 200 of FIG. 24 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 29. For example, the transceiver(s) 114 may include the one or more transceivers 106 and 206 and/or the one or more antennas 108 and 208 of FIG. 29. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100*a* of FIG. 23), the vehicles (100*b*-1 and 100*b*-2 of FIG. 23), the XR device (100*c* of FIG. 23), the hand-held device (100*d* of FIG. 22), the home appliance (100*e* of FIG. 23), the IoT device (100*f* of FIG. 23), a digital broadcasting terminal, a hologram device, a public safety device, an MTC device, a medical device, a FinTech device (or a finance device), a security device, a climate/environment device, the AI server/ device (400 of FIG. 23), the BSs (200 of FIG. 23), a network node, or the like. The wireless device may be mobile or fixed according to a use case/service.

In FIG. 25, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

The implementation example of FIG. 25 will hereinafter be described with reference to the attached drawings.

Figure 26:
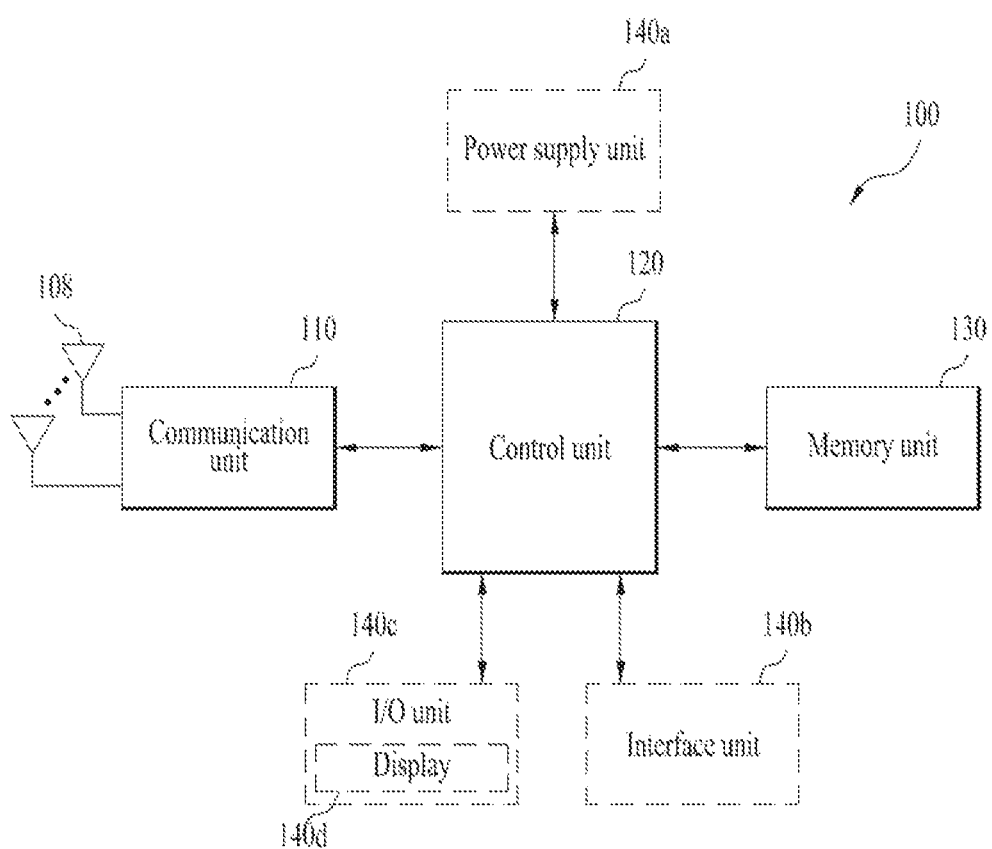

FIG. 26 is a block diagram illustrating a hand-held device 100 to which another embodiment of the present disclosure may be applied. The hand-held device may include a smartphone, a tablet (also called a smartpad), a wearable device (e.g., a smartwatch or smart glasses), and a portable computer (e.g., a laptop). The hand-held device 100 may be referred to as a mobile station (MS), a user terminal (UT), a mobile subscriber station (MSS), a subscriber station (SS), an advanced mobile station (AMS), or a wireless terminal (WT).

Referring to FIG. 26, the hand-held device 100 may include an antenna unit 108, a communication unit 110, a control unit 120, a memory unit 130, a power supply unit 140*a*, an interface unit 140*b*, and an input/output (I/O) unit 140*c*. The antenna unit 108 may be configured as a part of the communication unit 110. The blocks 110 to 130/140*a* to 140*c* correspond to the blocks 110 to 130/140 of FIG. 25, respectively.

The communication unit 110 may transmit and receive signals (e.g., data and control signals) to and from another wireless device and a BS. The control unit 120 may perform various operations by controlling elements of the hand-held device 100. The control unit 120 may include an application processor (AP). The memory unit 130 may store data/parameters/programs/code/commands required for operation of the hand-held device 100. Further, the memory unit 130 may store input/output data/information. The power supply unit 140*a* may supply power to the hand-held device 100, and include a wired/wireless charging circuit and a battery. The interface unit 140*b* may support connection between the hand-held device and other external devices. The interface unit 140*b* may include various ports (e.g., an audio I/O port and a video I/O port) for connection to external devices. The I/O unit 140*c* may receive or output video information/signal, audio information/signal, data, and/or user-input information. The I/O unit 140*c* may include a camera, a microphone, a user input unit, a display 140*d*, a speaker, and/or a haptic module.

For example, for data communication, the I/O unit 140*c* may acquire information/signals (e.g., touch, text, voice, images, and video) received from the user and store the acquired information/signals in the memory unit 130. The communication unit 110 may convert the information/signals into radio signals and transmit the radio signals directly to another device or to a BS. Further, the communication unit 110 may receive a radio signal from another device or a BS and then restore the received radio signal to original information/signal. The restored information/signal may be stored in the memory unit 130 and output in various forms (e.g., text, voice, an image, video, and a haptic effect) through the I/O unit 140*c*.

Figure 27:
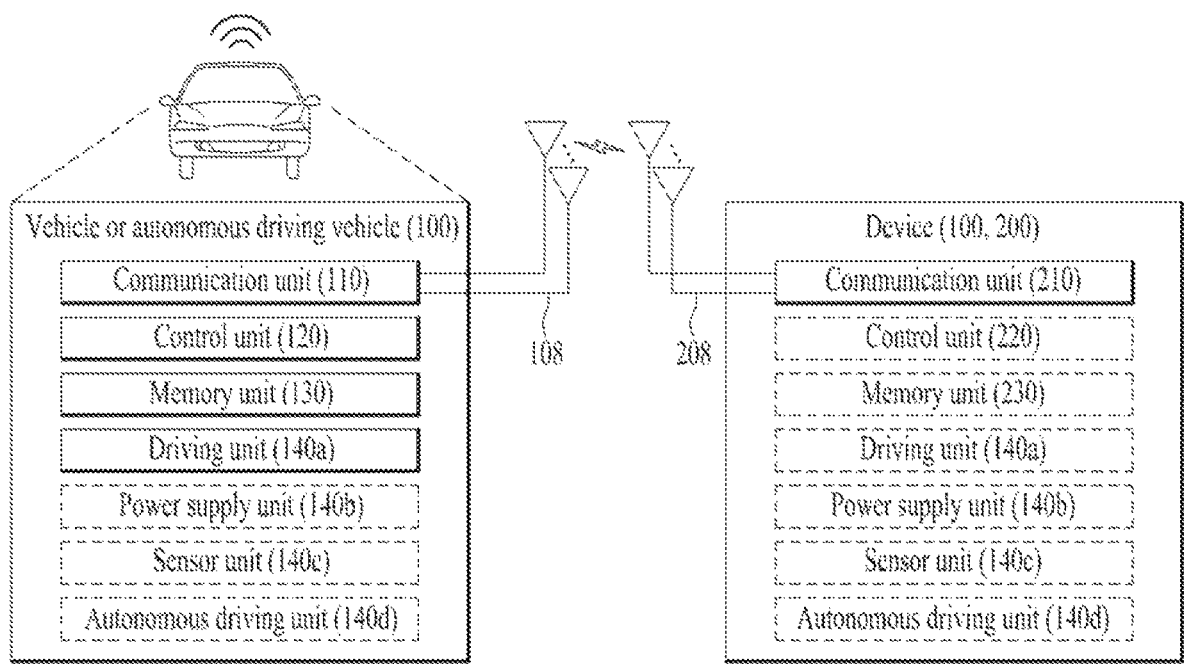

FIG. 27 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 27, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 24, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may enable the vehicle or the autonomous driving vehicle 100 to drive on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire information about a vehicle state, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140*c* may obtain information about a vehicle state and/or surrounding environment information. The autonomous driving unit 140*d* may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The method of performing a random access channel (RACH) procedure and apparatus therefor have been described based on the 5th generation (5G) new radio access technology (new RAT) system, but the method and apparatus are applicable to various wireless communication systems including the 5G NR system.

The invention claimed is:

1. A method of transmitting an uplink signal by a user equipment (UE) in a wireless communication system, the method comprising:
  transmitting a physical random access channel (PRACH);
  detecting downlink control information (DCI) in response to the PRACH during a window having a length exceeding 10 ms;
  receiving a physical downlink shared channel (PDSCH) within the window based on the DCI, and based on the UE being incapable of checking whether two bits of a first system frame number (SFN) included in the DCI are the same as two bits of a second SFN in which the PRACH is transmitted:
transmitting the uplink signal based on the PDSCH regardless of whether the two bits of the first SFN are the same as the two bits of the second SFN.

2. The method of claim 1, wherein based on the UE being capable of checking whether the two bits of the first SFN are the same as the two bits of the second SFN:
transmitting the uplink signal based on the PDSCH and based on the UE confirming that the two bits for the first SFN are the same as the two bits for the second SFN.

3. The method of claim 1, wherein the DCI is scrambled by a MsgB-Radio Network Temporary Identifier (RNTI).

4. A user equipment (UE) configured to transmit an uplink signal in a wireless communication system, the UE comprising:
at least one transceiver;
at least one processor; and
at least one memory operably connected to the at least one processor and configured to store instructions that, when executed, cause the at least one processor to perform operations comprising:
transmitting, through the at least one transceiver, a physical random access channel (PRACH);
detecting downlink control information (DCI) in response to the PRACH during a window having a length exceeding 10 ms;
receiving, through the at least one transceiver, a physical downlink shared channel (PDSCH) within the window based on the DCI, and
based on the UE being incapable of checking whether two bits of a first system frame number (SFN) included in the DCI are the same as two bits of a second SFN in which the PRACH is transmitted:
transmitting the uplink signal based on the PDSCH regardless of whether the two bits of the first SFN are the same as the two bits of the second SFN.

5. The UE of claim 4, wherein based on the UE being capable of checking whether the two bits for the first SFN are the same as the two bits of the second SFN:
transmitting the uplink signal based on the PDSCH and based on the UE confirming that the two bits of the first SFN are the same as the two bits of the second SFN.

6. The UE of claim 4, wherein the DCI is scrambled by a MsgB-Radio Network Temporary Identifier (RNTI).

7. An apparatus configured to transmit an uplink signal in a wireless communication system, the apparatus comprising:
at least one processor; and
at least one memory operably connected to the at least one processor and configured to store instructions that, when executed, cause the at least one processor to perform operations comprising:
transmitting a physical random access channel (PRACH);
detecting downlink control information (DCI) in response to the PRACH during a window having a length exceeding 10 ms; and
receiving a physical downlink shared channel (PDSCH) within the window based on the DCI, and
based on the UE being incapable of checking whether two bits of a first system frame number (SFN) included in the DCI are the same as two bits of a second SFN in which the PRACH is transmitted:
transmitting the uplink signal based on the PDSCH regardless of whether the two bits of the first SFN are the same as the two bits of the second SFN.

8. The method of claim 1, wherein the uplink signal is a Physical Uplink Shared Channel (PUSCH) based on the PDSCH providing a fallback Random Access Response (RAR) message.

9. The method of claim 1, wherein the uplink signal is a Physical Uplink Control Channel (PUCCH) based on the PDSCH providing a success Random Access Response (RAR) message.

10. The UE of claim 4, wherein the uplink signal is a Physical Uplink Shared Channel (PUSCH) based on the PDSCH providing a fallback Random Access Response (RAR) message.

11. The UE of claim 4, wherein the uplink signal is a Physical Uplink Control Channel (PUCCH) based on the PDSCH providing a success Random Access Response (RAR) message.

* * * * *